(12) United States Patent
Maturana et al.

(10) Patent No.: US 7,305,272 B2
(45) Date of Patent: Dec. 4, 2007

(54) CONTROLLER WITH AGENT FUNCTIONALITY

(75) Inventors: Francisco P. Maturana, Mayfield Heights, OH (US); Kenwood H. Hall, Hudson, OH (US); Raymond J. Staron, Richmond Heights, OH (US); Petr Slechta, Ceska Lipa (CZ); Pavel Tichy, Nymburk (CZ); Sivaram Balasubramanian, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 583 days.

(21) Appl. No.: 10/808,772

(22) Filed: Mar. 25, 2004

(65) Prior Publication Data

US 2004/0268186 A1 Dec. 30, 2004

Related U.S. Application Data

(63) Continuation-in-part of application No. 10/737,384, filed on Dec. 16, 2003.

(60) Provisional application No. 60/433,892, filed on Dec. 16, 2002.

(51) Int. Cl.
*G05B 15/00* (2006.01)
*G06F 9/44* (2006.01)

(52) U.S. Cl. .......................... 700/83; 717/116

(58) Field of Classification Search .................. 700/83, 700/79, 17, 18, 86, 87, 34, 37, 2; 717/115, 717/138, 139, 108, 109, 113, 114, 116, 162, 717/165

See application file for complete search history.

(56) References Cited

U.S. PATENT DOCUMENTS

| | | | | |
|---|---|---|---|---|
| 5,301,336 A | * | 4/1994 | Kodosky et al. | 715/846 |
| 5,499,364 A | * | 3/1996 | Klein et al. | 709/202 |
| 5,909,368 A | * | 6/1999 | Nixon et al. | 700/2 |
| 6,102,965 A | * | 8/2000 | Dye et al. | 717/109 |
| 6,112,223 A | * | 8/2000 | Chadwick et al. | 709/201 |
| 6,282,699 B1 | * | 8/2001 | Zhang et al. | 717/109 |
| 6,442,619 B1 | * | 8/2002 | Ouellette | 719/316 |
| 6,459,944 B1 | | 10/2002 | Maturana et al. | |
| 6,647,300 B1 | | 11/2003 | Balasubramanian et al. | |
| 6,687,682 B1 | * | 2/2004 | Esfandiari et al. | 705/37 |
| 6,721,612 B2 | * | 4/2004 | Aramaki et al. | 700/87 |

* cited by examiner

*Primary Examiner*—Thomnas K. Pham
(74) *Attorney, Agent, or Firm*—Keith M. Baxter; R. Scott Speroff

(57) ABSTRACT

A controller configured to operate as at least one agent, a method of configuring a controller for operation as part of a multi-agent distributed control system, and a configuration device for so configuring a controller, are disclosed. The controller includes at least one processing device and at least one storage medium that is in communication with the at least one processing device. The at least one storage medium stores a plurality of program portions that are executed by the at least one processing device, and the plurality of program portions includes first, second and third program portions. The first program portion is capable of generating first signals that are commands to be provided to a controlled device, the second program portion is capable of governing standard agent-type functionality, and the third program portion is capable of governing application-specific agent-type functionality.

24 Claims, 9 Drawing Sheets

CONTROLLER WITH AGENT FUNCTIONALITY

CROSS-REFERENCE TO RELATED APPLICATIONS

This application is a continuation-in-part of U.S. patent application Ser. No. 10/737,384 filed on Dec. 16, 2003 and entitled "Decentralized Autonomous Control for Complex Fluid Distribution Systems", which is based on provisional application 60/433,892 filed Dec. 16, 2002 and entitled "Agent-Based Active Diagnostics System for Complex Distribution Networks", each of which is hereby incorporated by reference herein, and claims the benefit thereof.

STATEMENT REGARDING FEDERALLY SPONSORED RESEARCH OR DEVELOPMENT

- -

BACKGROUND OF THE INVENTION

The present invention relates to computerized control systems and, more particularly, distributed control systems that employ multiple, distinct control devices that are connected to one another by way of a network and that interact with one another in a manner allowing for overall control of a process.

A variety of commercial and industrial processes can be automated using one or more industrial controllers (or industrial computers). Generally, an industrial controller is a specialized computer providing input/output (I/O) circuitry attached to sensors and actuators on the machines of the industrial process. The industrial controller executes a control program to read inputs from sensors on the machines implementing the process, and based on the values of those inputs and control logic of the control program, produces outputs to actuators to control the process. Industrial controllers are frequently modular in construction, so that the number of input and output circuits and the processor power can be tailored to the demands of the particular process.

In a centralized model for industrial control, a single central controller (e.g., a specialized computer) coordinates all aspects of the controlled process. Input signals representing values from sensors on the controlled process are communicated to the central controller which executes a control program to develop output signals which are communicated to actuators on the controlled process.

The centralized model is conceptually simple and requires programming only a single device. Nevertheless, the centralized model has some disadvantages. Control systems using this model are particularly vulnerable to failure of the single central controller. Further, communication of all I/O signals to a central location and executing the control program on a single computer, particularly for large control systems, can place undue burdens on processing resources and communication bandwidth. Additionally, a significant cost in automating a process with an industrial controller is the cost of preparing the control program. The same variation in processes that drives the need for the controller architecture to be flexible normally requires a control program to be written specifically for or extensively modified for the process. This development of the control program can be prohibitively expensive for complex processes.

These disadvantages associated with the centralized control model have generated interest in an alternate control model, namely, the distributed control model. In the distributed model for industrial control, the control program is executed by a number of spatially separate controllers intercommunicating only as needed on a common network. By placing these controllers near relevant controlled/monitored devices and/or relevant I/O points, the communication of large numbers of control/monitoring signals and/or large amounts of I/O data is diminished. Having multiple control devices can also reduce the susceptibility of the control system to failure of any one device. Nevertheless, difficulties remain with distributed control systems. In particular, it can be expensive and time-consuming to develop multiple control programs for the different controllers of a distributed control system to appropriately divide the control tasks among the various distributed controllers and coordinating their actions.

The problems related to developing control programs for such distributed control systems have spurred investigation of systems that employ multiple intelligent agents, which also can be termed agents or autonomous cooperative units (ACUs), at the various distributed controllers. In such multi-agent systems (which also can be termed autonomous cooperative systems), a job description is presented to a large number of agents. The agents, based on knowledge of their own capabilities and limitations, bid on portions of the job in response to requests for bids from other agents. Effectively, the agents write their own program, such that control programs are simply developed and the potential exists for control programs to be quickly changed as new circumstances develop, such as changes in the control problem or the loss of particular agents and/or equipment. Such multi-agent systems are applicable to a wide variety of situations, and a description of one exemplary multi-agent system is described, for example, in the aforementioned patent applications.

The design of multi-agent systems borrows from a market model of the economy in which many different autonomous individuals organize themselves to produce complex products or services without central control. At a high-level, the agents of multi-agent systems share many similarities with one another in terms of their operation. This is true both with respect to different agents of the same multi-agent system, and with respect to the agents of different systems. For example, regardless of the type of machines that a given multi-agent system is intended to control, the agents of the multi-agent system nevertheless interact with one another in the manner described above involving bidding on portions of a job.

However, despite the overall high-level operational similarities among the agents of multi-agent systems, the behavior of agents of necessity still typically varies from system to system depending upon the application, as well as varies from agent to agent in each given system. Because different processes employ a wide variety of specific machines, and because the particular machines of any given process can also differ greatly from one another, it is impossible to cost-effectively develop a single, standard agent that would be capable of interacting with any and every arbitrary machine of any and every given system. In particular, the control programs or algorithms governing different machines can vary greatly from one machine to another. Likewise, the number, type and characteristics of sensor signals and actuator signals vary greatly from machine to machine.

In conventional distributed control systems that employ controllers that are not agent-based, particularly industrial control systems of this type, the controllers often are programmed with application-specific control programs that take the form of complicated "ladder logic" programs. These ladder logic programs are intended to govern the relationships between the controllers and the specific machines assigned to be controlled by those controllers, but are not generally intended to govern high-level interactions between the multiple controllers of the distributed control system. Such ladder logic control programs are ubiquitous not only for historical reasons but also because of the great flexibility afforded by such programs. Indeed, numerous such programs are in existence for implementation on controllers in a wide variety of applications and circumstances.

Given that the use of ladder logic programs is well-known and that many ladder logic programs for a wide variety of applications are already in existence, and given that (as discussed above) the tailoring of agents for particular applications is complicated and expensive, it would be desirable if high-level agent-type programming could be somehow implemented onto controllers employing such ladder logic control programs such that the agent-type programming and ladder logic control programs were integrated with one another to form composite agents on those controllers. Such integration would make it possible to achieve distributed control systems that provided the benefits of multi-agent systems in terms of the high-level interaction and collaboration among controllers to address the needs of the controlled process and yet, at the same time, retained the benefits associated with using existing ladder logic control programs and programming techniques to tailor controllers for operation in relation to the particular machines controlled by those controllers.

BRIEF SUMMARY OF THE INVENTION

The present inventors have recognized that, in order to integrate agent-type programming with conventional ladder logic or other control programming on a controller, a portion of the agent-type programming must be specially configured for interactions with the control programming while another portion of the agent-type programming will remain the same regardless of the controller in which it is being implemented or the process being controlled by the distributed control system of which the controller is a part. In view of this, the present inventors have further recognized that a composite agent on a controller could be simply achieved by (a) providing the controller with generalized agent programming in addition to conventional operating system programming and base firmware, and (b) customizing the controller with application-specific programming that not only included ladder logic or other application-specific control programming but also included application-specific agent programming.

The present inventors have further recognized that, in certain embodiments such as those employing industrial controllers, communications between the agent-type programming (both general and application-specific) and the application-specific control programming, can occur by way of one or more data tables existing on the industrial controllers. That is, signals can be passed between the various programs simply by modifying and reading values stored on a data table, and/or by way of generating simple signals/threads when such modifications of values occur. By using such data table(s) for communication between the agent-type programming and control programming, customization of the various programs for interaction with one another is kept to a minimum.

The present inventors have further recognized that it would be desirable to provide a specialized interface that facilitated the development of such application-specific programming, both in terms of its agent-type programming and its ladder logic or other control programming components. It would also be desirable if such an interface provided one or more libraries of templates of application-specific programming, which could be selected and modified by a user as appropriate to the programming of a given distributed control system, to further facilitate the creation of application-specific programming suitable for particular controlled processes. It additionally would be desirable if such a specialized interface facilitated the assignment of specific agents to specific controlled machines, and the assignment of specific agents to specific controllers of the distributed control system, thus allowing for the complete design of a multi-agent distributed control system.

In particular, the present invention relates to a controller configured to operate as at least one agent. The controller includes at least one processing device and at least one storage medium that is in communication with the at least one processing device, where the at least one storage medium stores a plurality of program portions that are executed by the at least one processing device. The plurality of program portions includes a first program portion capable of generating first signals that are commands to be provided to a controlled device, and a second program portion capable of governing standard agent-type functionality. The plurality of program portions additionally includes a third program portion capable of governing application-specific agent-type functionality.

The present invention further relates to a distributed control system for controlling a process performed by a plurality of controllable devices including first and second controllable devices. The distributed control system includes a network, first and second controllers coupled to the network, where the first and second controllers include first and second processors, respectively, and first and second storage media, respectively. First and second application-specific control programs are stored on the first and second storage media, respectively, the first and second control programs enabling the respective first and second controllers to generate commands to be provided to the first and second controllable devices, respectively. Further, first and second agent-related programs are additionally stored on the first and second storage media, respectively, the first and second agent-related programs each including agent-type programming to enable the first and second controllers to operate as agents, to communicate with one another via the network, and to interact with the first and second control programs to govern operations of the first and second controllable devices.

Additionally, the present invention relates to a configuration device for enabling an industrial controller to operate as an agent that governs a controllable device. The configuration device includes a storage medium that stores an application-specific agent program portion capable of governing at least some agent-type functionality and an application-specific control program portion capable of generating control signals to be provided to the controllable device, and an interface configured to allow the application-specific agent program portion and the application-specific control program portion to be downloaded onto the industrial controller.

Further, the present invention relates to a method of configuring a controller for operation as part of a multi-agent distributed control system that controls a plurality of devices to perform a process. The method includes providing a controller that stores, and is capable of operating in accordance with, first and second program portions. The first program portion is capable of processing incoming signals received from, and outgoing signals provided onto, a network connected to the controller so that network protocol information appropriate for communicating the signals over the network is removed from or added to the incoming and outgoing signals, respectively. The second program portion is capable of governing general agent-type functionality of the controller. The method further includes supplementing the controller with application-specific control programming and application-specific agent-type programming so that the controller is able to operate as an agent in relation to both other agents of the multi-agent distributed control system and in relation to at least one of the controllable devices.

Additionally, the present invention relates to a control device that includes a processor and a memory device in communication with the processor, where agent-related information is stored on the memory device that includes agent-related programming, first information and second information. The agent-related information can be performed by the processor so that the control device can operate as a first agent. The first information concerns network addresses of other agents with which the control device is capable of communicating by way of a network, and the second information concerns capabilities of the other agents. The control device outputs messages capable of being communicated over the network to at least some of the other agents, and the processor determines the messages that should be output based upon the agent-related programming, the first information and the second information.

These particular objects and advantages may apply to only some embodiments of the invention covered by only some of the claims and thus do not define the scope of the invention.

DETAILED DESCRIPTION OF THE PREFERRED EMBODIMENT

Figure 1:
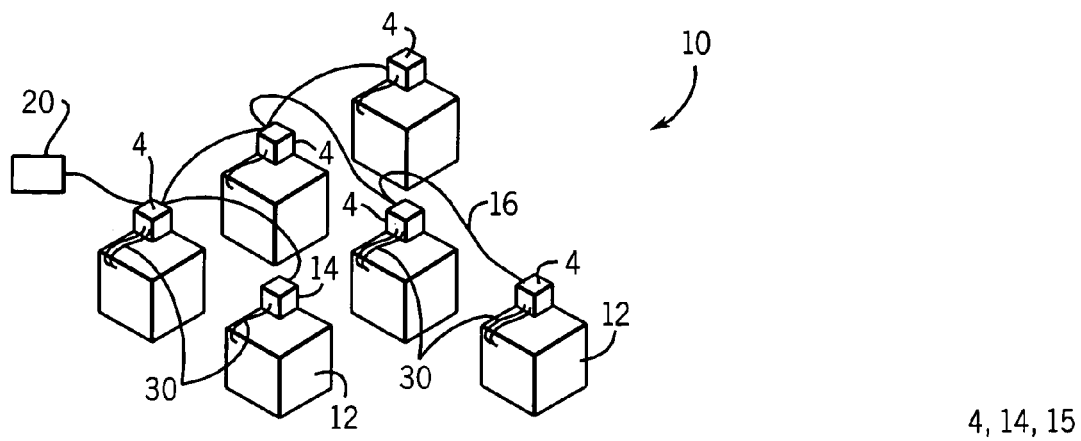
FIG. 1 is a simplified perspective view of a process including a number of separate machines intercommunicating via distributed controllers connected over a network forming a distributed control system such as may be used with the present invention.

Referring to FIG. 1, a distributed control system 10 controls and/or monitors the operation of a process performed by a plurality of machines 12, each of which is associated with a respective electronic computer or controller 4,14 of the control system. Each controller 4,14 is configured for electrical communication through a respective I/O line 30 with its respective machine or machines. The process can be any of a variety of different processes in a variety of environments such as, for example, an industrial process performed by a plurality of manufacturing machines such as drills, lathes, ovens, mills and the like. In such embodiments, the controllers 4,14 can be ControlLogix programmable control modules commercially available from Rockwell Automation, Inc. of Milwaukee, Wis., the beneficial assignee of the present invention. Also, for example, the process could relate to the distribution of a resource or multiple resources, such as water within a naval vessel, energy from energy producers to energy consumers by way of a power distribution grid, or heated or cooled air within a building employing a heating, ventilation and air-conditioning (HVAC) system. The machines 12 are representative of any devices that can be controlled or monitored by a distributed control system, and are intended to encompass, for example, actuatable machines, sensors, communication devices, and input/output devices.

The electronic controllers 4,14 are linked to each other via a network 16 of a type well known in the art allowing for connected messaging or other communication protocol between the various controllers 4,14, such that each of the controllers 4,14 can produce messages for or consume messages from others of the controllers 4,14. The network 16 can be, for example, an Ethernet, ControlNet or DeviceNet-type network (or even the internet) and, in certain embodiments, is representative of multiple redundant networks (which can be implemented using redundant network media) to resist failure. A human machine interface HMI 20, being a conventional computer terminal or other similar device, can be attached to the network 16 or to one or more of the controllers 4,14 (as shown) to allow for programming of the various controllers or data entry as will be described. In alternate embodiments, the HMI 20 is coupled to the network 16 or one or more of the controllers 4,14 by way of the world wide web or internet (not shown). In such embodiments, the HMI 20 can employ a browser program while the distributed control system 10 (or portion thereof, e.g., one of the controllers 4,14) employs a server program, or vice-versa. In some alternate embodiments, the HMI 20 or human-machine interfaces like it could be considered some of the machines 12.

Figure 2:
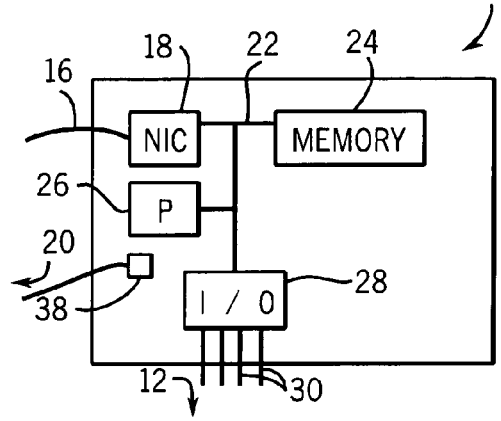
FIG. 2 is a block diagram of exemplary hardware components of one of the controllers of FIG. 1, which include a processor, a memory holding data and programs executed by the processor, a network card providing an interface to the network of FIG. 1 and I/O circuits for communicating with the machines of FIG. 1.

Referring now to FIG. 2, exemplary hardware components 15 within each of the controllers 4,14 are shown. In particular, the hardware components 15 at each of the controllers 4,14 include a network interface 18 of conventional design for transmitting and receiving messages on the network 16 and communicating them to an internal bus 22 (which typically is a high-speed bus). The internal bus 22 links the network interface 18 with memory 24, a processor 26 and I/O circuits 28, the latter of which provide I/O lines 30 leading to sensors or actuators on the machines 12.

Depending upon the embodiment, the hardware components of the controllers 4,14 can vary from those shown. In certain embodiments, for example, a secondary communication port is available for connection of the HMI 20. Also, for example, the memory 24 can take a variety of forms and need not include only a single memory device. Further, in certain embodiments, one or more of the controllers 4,14 can employ more than one memory device, including one or more memory devices that are not physically located at the respective controller, such as memory devices that are located at others of the controllers 4,14 or at other locations with which the respective controller can be in communication by way of the network 16 or other communication media.

Figure 3:
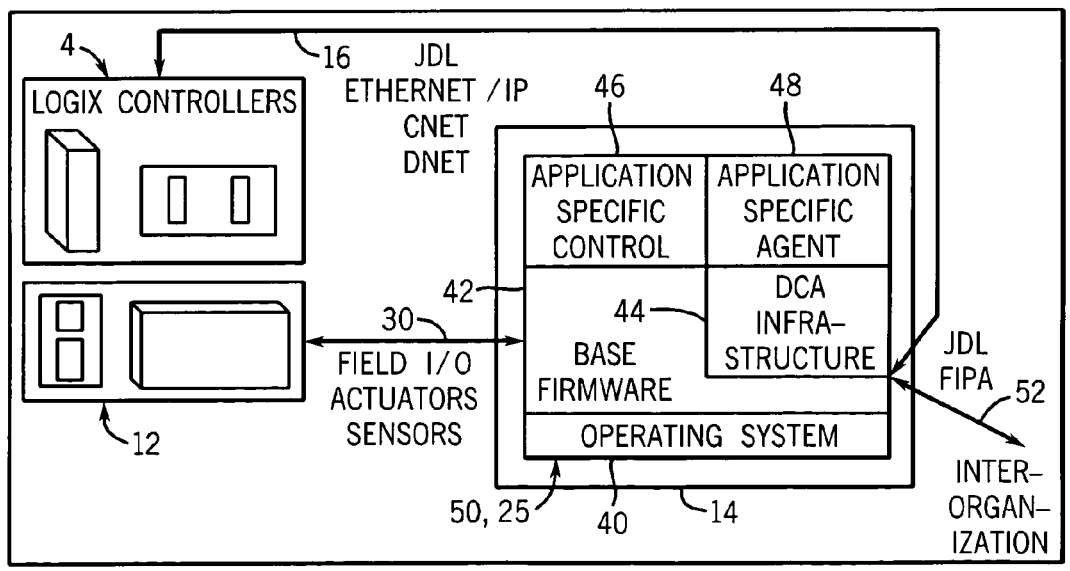
FIG. 3 is a block diagram showing exemplary software components included within one of the controllers of FIG. 1, which are stored on the memory and executed by the processor shown in FIG. 2, as well as the interaction of those software components with other components outside of the controller.

Turning to FIG. 3, the hardware components 15 within the controller 14 operate in conjunction with various software components 25 that can be stored within the memory 24 of the controller (or elsewhere) and executed by the processor 26 of that controller. In accordance with the present invention, the software components 25 of the controller 14 operate in conjunction with one another to constitute an intelligent agent (or simply an "agent") 50. The software components 25 shown in FIG. 3 are intended to be representative of similar software components that exist within each of the other controllers 4 of the distributed control system 10. The ensemble of controllers 4,14 of the distributed control system 10, each employing its own agent or agents, operates as a multi-agent system (MAS).

Each agent 50 is an autonomous cooperative unit that encapsulates application knowledge, and is capable of proactive and reactive behaviors in relation to the other intelligent agents in order to adapt the distributed control system 10 to different tasks and to adjust in response to the occurrence of unforeseen conditions. Each agent 50 in particular is autonomous such that it makes its own decisions, is responsible for carrying out its decisions toward successful completion, and controls and/or monitors the respective machine(s) 12 assigned to it. Also, each agent 50 is capable of cooperating with other agents, to adapt and respond to diverse events and mission goals by adjusting its behavior and that of the machine(s) 12 it controls. To enable this cooperation, all of the agents 50 typically share a common language, as discussed further below. Depending upon the embodiment, either one or more than one agent 50 can be employed on each of the controllers 4,14. Often, although not necessarily, the number of agents 50 implemented on a given one of the controllers 4,14 will correspond to the number of machines 12 that are being controlled by way of that controller.

In particular, the software components 25 of the controller 14 making up the agent 50 include an operating system 40, base firmware 42, distributed control agent (DCA) infrastructure firmware 44, application-specific control program software 46, and application-specific agent software 48. The operating system 40, base firmware 42 and application-specific control program software 46 all are conventional in that they encompass programming that can be found in controllers employed in non-agent-based distributed control systems, particularly conventional non-agent-based industrial controllers. Thus, the agent 50 is in fact a "composite" agent formed by the integration of these programs with the DCA infrastructure firmware 44 and the application-specific agent software 48, which together constitute the agent-type programming of the composite agent.

The operating system 40 can be any of a variety of operating systems or similar programs that are capable of governing low-level operations of the controller 14 and supporting the operation of each of the other software components 25. The operating system 40 in particular can be, for example, a conventional multitasking operating system such as the Windows NT operating system, such that multiple programs can be simultaneously executed as tasks by the processor 26. The operating system 40 can also be multithreading and, in alternate embodiments in which a given controller has multiple processors 26, the operating system 40 further can be multiprocessing.

Referring still to FIG. 3, the base firmware 42 is representative of conventional software programming (typically stored in a read-only memory) that is capable of governing interactions between the controller 14 and devices external to the controller. For example, the base firmware 42 formats signals produced by the agent 50 for communication onto the network 16 so that those signals can be sent to the other controllers 14, that is, formats signals so they are in accordance with the protocol of the network (e.g., in accordance with the requirements of an Ethernet, ControlNet or DeviceNet-type network and/or, in some embodiments, the TCP/IP or UDP/IP protocol, or the IEEE802.11b (wireless) protocol). Likewise, the base firmware 42 is able to receive and process signals received off of the network 16, so that the signals can be understood by the agent 50. The base firmware 42 also governs communications between the controller 14 and the machine(s) 12 coupled to the controller by way of the I/O line(s) 30, as well as between the controller 14 and other devices at external organizations (as indicated by arrow 52).

The base firmware 42 also enables the creation and use of (and otherwise supports the operation of) the application-specific control program software 46, which governs the manner in which the agent 50 controls and/or monitors the machine(s) 12 assigned to the agent. The application-specific control program software 46 typically is customized for operation with the particular machine(s) 12 being controlled/ monitored by the particular controller 14. Often the application-specific control program software 46 is written in ladder logic code, although depending upon the embodiment this need not be the case. Although the application-specific control program software 46 in most embodiments is required as one of the software components 25, particularly where the machine(s) 12 being controlled/monitored can vary considerably such as in industrial environments, it is possible that in certain embodiments (e.g., embodiments in which the distributed control system 10 only employs standardized machine(s) of a single type or limited types) generic control program software could entirely replace the application-specific control program software (or be incorporated as part of one or more of the other software components such as the base firmware 42).

To achieve controllers 4,14 that can operate as agents 50, the software components 25 of the controllers are not limited to the operating system 40, base firmware 42 and application-specific control program software 46, but rather additionally include the DCA infrastructure firmware 44 and the application-specific agent software 48. As discussed in more detail with reference to FIGS. 4 and 5, the DCA infrastructure firmware 44 and the application-specific agent software 48 each include programming that governs certain high-level or "agent-type" behaviors of the agent. The application-specific agent software 48 is application-specific in that it typically reflects the specific machine(s) 12 that have been assigned to the particular agent 50 to be controlled and/or monitored, and/or the particular distributed application or process with which the agent 50 is affiliated. To properly interact with the specific machine(s) 12 assigned to the agent 50, the application-specific agent software 48 of the agent is capable of interacting with the application-specific control program software 46.

The DCA infrastructure firmware 44 operates as an extension of the base firmware 42, particularly in order to govern, support and facilitate agent-type functionality of the agent 50 in accordance with both the DCA infrastructure firmware itself and the application-specific agent software 48. The DCA infrastructure firmware 44, in contrast to the application-specific agent software 48, governs high-level agent behavior of the agent 50 that is not agent-specific, and is common among multiple agents of the distributed control system 10, as discussed in more detail with reference to FIGS. 4 and 5. The DCA infrastructure 44 is in direct communication with the base firmware 42 (and/or, in certain alternate embodiments, with the operating system 40) and the application-specific agent software 48, and performs several functions in particular.

To begin, the DCA infrastructure firmware 44 supports multi-threaded communications among the different agents 50 existing at the different controllers 4,14. The DCA infrastructure firmware 44 also potentially supports multi-threaded communications between the agents of the distributed control system 10 and those of external organizations by way of alternate communication linkages 52, as well as between multiple agents of a single controller when multiple agents are associated with a single controller. To support and conduct these communications, it is the DCA infrastructure firmware 44 that constructs messages for transmission to other agents, and likewise the DCA infrastructure firmware 44 that disassembles received messages for interpretation. Additionally, in the present embodiment, the DCA infrastructure firmware 44 also wraps and unwraps these messages in additional protocol information as discussed in greater detail below.

Further, it is the DCA infrastructure firmware that conducts the planning of the agent 50 in terms of determining how it will interact with other agents and how it will control or otherwise interact with the machine(s) 12 under its control. Thus, it is the DCA infrastructure that determines how to negotiate with, and generates bid request and bid messages for, other agents. In a preferred embodiment, the DCA infrastructure firmware 44 also enables dynamic downloading of the application-specific agent software 48 and application-specific control program software 46 during development of the overall distributed control system 10 (as discussed in further detail with reference to FIGS. 6-11). Further, the DCA infrastructure firmware 44 allows for remote activation and deactivation of the agent-type functionality of the agent 50.

In certain embodiments, the DCA infrastructure firmware 44 is priority-based and, particularly where the distributed control system 10 is employed in an industrial environment, the application-layer protocol employed by the DCA infrastructure firmware is a protocol commonly utilized by industrial control systems such as the Common Industrial Protocol (CIP). The DCA infrastructure firmware 44 is typically written in a high-level programming language such as C++ or JAVA, although the language can vary from embodiment to embodiment.

As shown in FIG. 3, in the present embodiment, messages between different agents 50 are scripts communicated in the job description language (JDL), and wrapped in additional formatting information in accordance with a specialized, universally-accepted communication language, which in the present embodiment is the Foundation for Intelligent Physical Agents (FIPA) Agent Communication Language (ACL). Although the base firmware 42 initially receives incoming messages and processes those messages to remove protocol information specific to communication over the network 16 (e.g., Ethernet protocol information), it is the DCA infrastructure firmware 44 that further processes the received messages to unwrap the JDL information of the messages from the FIPA ACL wrapper and then extract the content of the JDL messages having to do with communication between agents. Likewise, it is the DCA infrastructure firmware 44 that creates agent messages in the JDL language, and wraps those messages in the FIPA ACL wrapper prior to the messages being further configured by the base firmware 42 for transmission over the network 16.

In alternate embodiments, the messages between agents 50 could be in any of a number of other formats or languages other than JDL, such as XML, KQML or HTML. Also, in alternate embodiments, languages other than FIPA ACL could be employed as a wrapper about the messages. Further information regarding the manner of communication among agents is provided in U.S. Pat. No. 6,647,300 entitled: Bidding Partner Cache For Autonomous Cooperative Control System; U.S. Pat. No. 6,459,944 entitled: Self-Organizing Industrial Control System Using A Specific Process To Evaluate Bids; U.S. Pat. No. 6,430,454 entitled: Self-Organizing Industrial Control System Using Iterative Reverse Modeling To Evaluate Bids; U.S. Pat. No. 6,272,391 entitled: Self Organizing Industrial Control System Importing Neighbor Constraint Ranges, and U.S. Patent Application Publication No. 2003/0078678A1 entitled: Language Structure For Autonomous Cooperative Control System, each beneficially assigned to the present assignee and hereby incorporated by reference.

Figure 4:
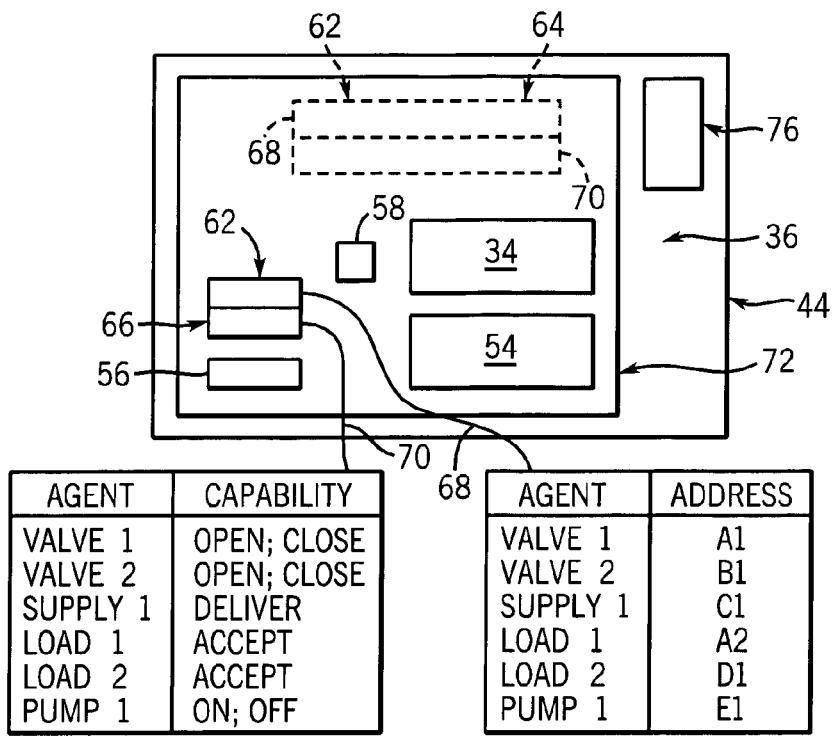
FIG. 4 is a block diagram showing in more detail one of the software components shown in FIG. 3.

Referring additionally to FIG. 4, the DCA infrastructure firmware 44 includes several software subcomponents 36 for performing certain of its functions. As shown, these software subcomponents 36 include a planner 72, which itself includes further software subcomponents as discussed below, as well as an execution controller 76. The planner 72 is the portion of the agent 50 that is capable of generating JDL messages for communication to other agents, and capable of receiving and processing JDL messages from those other agents. This is accomplished by way of JDL parsing/integration software 34 included within the planner 72. Further, it is the planner 72 that applies and removes the FIPA ACL protocol information with respect to the JDL messages, by way of FIPA ACL wrapping/unwrapping software 54. Additionally, the planner 72 also includes algorithms that determine how the agent 50 submits bid requests, bids, and otherwise negotiates with other agents, by way of negotiation algorithm software 56. In some embodiments, the planner 72 further can include subcontracting management algorithm software (not shown) by which the agent 50 interacts with other agents to satisfy portions of jobs that the agent itself cannot satisfy.

Further as shown in FIG. 4, in the present embodiment the planner 72 additionally interacts with one or more directory facilitators 62 by which the agent 50 is provided with information about other agents of the distributed control system 10 and about their capabilities. To increase the robustness of the overall multi-agent system, in the present embodiment the directory facilitators 62 employed in the distributed control system 10 as a whole (not just the specific controller 14) include both one or more global directory facilitators (GDFs) 64 and one or more local directory facilitators (LDFs) 66, and these typically are part of the DCA infrastructure firmware 44 as permanent generic components. The LDFs 66 generally store information that is of interest to the particular controller(s) or agent(s) with which the LDFs are respectively associated, while the GDF(s) 64 generally store information that is of interest to the entire distributed control system 10 or of interest at least to sections of the distributed control system that encompass multiple LDFs 66.

Typically, each of the controllers 4,14 of the distributed control system 10 includes its own respective LDF 66, while the distributed control system 10 will typically only have one GDF 64 located at one of the controllers 4,14 or at another location in communication with the controllers. In some embodiments, several GDFs 64 associated with certain sections of the distributed control system 10 will be located at more than one of the controllers 4,14, albeit in such embodiments some of the controllers will be without GDFs such that the number of GDFs will be less than the number of LDFs. Because each controller typically has its own LDF 66 but not its own GDF 64, the GDF shown in FIG. 4 is shown by way of a dashed line. In alternate embodiments, more than one GDF 64 can be employed at one or more of the controllers 4,14, or more than two-levels of directory facilitators can be employed in the distributed control system (e.g., there could be local, intermediate, and global directory facilitators).

Each of the LDFs 66 and GDFs 64 of the planner 72 of the DCA infrastructure firmware 44 provides a cache-like storage area. The LDF(s) 66 associated with a given agent typically are accessible by the other portions of the planner 72, the DCA infrastructure firmware 44, and the application-specific agent software 48 of that agent. Because the GDF(s) 64 typically serve more than one agent and can serve each of the agents of the distributed control system 10 (and even possibly other agents of external organizations), the GDF(s) serve as a central clearinghouse of agent-related information that can be selectively downloaded to the multiple LDFs of the distributed control system associated with multiple agents. Typically, when the agent 50 and other agents of the distributed control system 10 are initialized during development of the multi-agent system, each agent emits a registration message to its corresponding LDF 66. The LDF 66 in turn registers the new agent in the GDF 64 so that the information can later be used to match requests with the capabilities of agents.

Further description of LDFs and GDFs is provided in U.S. patent application Ser. No. 09/621,718 entitled Global Resource Locator for Autonomous Cooperative Control Systems, which is beneficially assigned to the present assignee and hereby incorporated by reference. Although, in the present embodiment, the directory facilitators 62 are described as being subcomponents within agent programming, in other embodiments, some or all of the directory facilitators 62 constitute agents in their own right, such that the directory facilitators handle inter-agent communication in accordance with agent communication protocols.

Further as shown in FIG. 4, each of the directory facilitators 62 of the DCA infrastructure firmware 44 includes a first, "white pages" portion 68 and a second, "yellow pages" portion 70. The first portion 68 of each of the directory facilitators 62 specifically includes information correlating the names/identities of different agents that exist within the distributed control system 10 (or even, possibly, agents that are in external organizations) with addresses/locations of those agents. This information allows the agent 50 to properly direct messages intended for specific agents to the addresses of those agents. For example, the first "white pages" portion 68 of the LDF 66 shown in FIG. 4 shows five agents having five addresses. In that example, the addresses of two of the agents have the first character "A", indicating that those two agents are located at a single one of the controllers 14 that corresponds to "A".

The second portion 70 of each of the directory facilitators 62, in contrast, includes information about the capabilities of the different agents that exist within the distributed control system 10 (or even, possibly, agents that are in external organizations). Thus, when the agent 50 desires to find agents that are capable of providing certain services, the agent is able to consult the second portion 70 to identify such agents. An example of the information contained in the second, "yellow pages" portion 70 of the LDF 66 shown in FIG. 4 shows five agents 50 having capabilities corresponding to the machines 12 that are controlled/monitored by those agents. For example, each of the agents corresponding to a valve has a capability of opening or closing, while each of the agents corresponding to a load has a capability of accepting (consuming) resources while an agent corresponding to a source has a capability of delivering or producing a resource.

Further as shown in FIG. 4, in the present embodiment a capability matcher 58 is provided that monitors communication patterns among different agents and identifies, by way of learning protocols, groups of agents or "communication clusters" that frequently communicate with one another in certain contexts, e.g., to address certain issues that repeatedly occur, or for other reasons. Where communication clusters are identified, the capability matcher 58 modifies the information stored within the LDFs 66 or GDFs 64 in a manner such that the agents follow special context coordination protocols when certain circumstances arise or in certain contexts, for example, the ContractNet protocol. By operating in accordance with such protocols, the agents tend to modify their communication and negotiation behavior in ways that result in a reduction in the number of signals that are sent among agents and processed. This in turn reduces the amount of communication that occurs among agents and increases the speed of collaborative decisionmaking among the agents.

For example, in certain embodiments, upon identifying a communication cluster associated with a particular operational context, the capability matcher 58 will store only the addresses of certain agents of the communication cluster in one or more of the directory facilitators 62 (or a cache associated therewith). Consequently, agents operating in accordance with context coordination protocols will tend to only contact or communicate with other agents in that communication cluster and ignore agents outside the cluster.

The operation of the capability matcher in identifying appropriate communication clusters is based upon historic behavior of the agents of the distributed control system, and is continually updated as the distributed control system continues to operate. That is, the capability matcher 58 is constantly analyzing agent interactions to determine preferred communication and collaboration patterns among the agents to address various process issues, in order to identify new communication clusters and modify previously identified communication clusters. As the capability matcher 58 identifies new patterns and changes in old patterns, it modifies the information stored in the GDFs/LDFs so as to conform to these evolving patterns. In certain embodiments, it is presumed that communication cluster information is only accurate for a limited period of time, and consequently information corresponding to certain communication clusters is only retained in the GDFs/LDFs for such limited amounts of time and then deleted (e.g., upon the expiration of timers).

The exact amount and types of communication among the LDF(s) 66 and GDF(s) 64 can vary depending upon the particular distributed control system and the particular process being controlled. In certain embodiments, the LDF(s) 66 regularly communicate with the GDF(s) 64 and provide information thereto, by way of a periodic, "heart-beating" signal. By providing such regular communications between the LDF(s) 66 and the GDF(s), the robustness of the system is increased. In other embodiments, the LDF(s) 66 communicate with the GDF(s) 64 on an asynchronous basis, e.g., only when relevant data is received by the LDF(s) that should be transmitted to the GDF(s) and when data from the GDF(s) is needed by the LDF(s).

When new agents are created, agent address and capability information is first provided to the LDF(s) 66 corresponding to those agents. The degree to which this information concerning new agents is passed from those LDF(s) corresponding to the new agents to the GDF(s) 64 and/or to other LDF(s) can vary depending upon the embodiment, and in particular can depend upon whether the directory facilitators 62 are programmed to perform breadth propagation, depth propagation or no-knowledge propagation. LDF(s) 66 employing the breadth propagation technique automatically communicate information regarding new agents to the GDF(s) 64 above them, and no further communication takes place. In the case of depth propagation, LDF(s) 66 communicate information to their corresponding GDF(s), which in turn communicate that information to all of the other LDFs and/or GDFs of the distributed control system. As for no-knowledge propagation, this refers to behavior in which the LDF(s) 66 receiving new information do not pass that information on to any other directory facilitators. Then, when a search is requested of a LDF 66 following no-knowledge propagation, the search is first processed locally at that LDF and then, if the LDF lacks appropriate information, the search is then passed on to other directory facilitators.

As for the execution controller 76, this portion of the application-specific agent software 48 operates as an intermediary between the application-specific control program software 46 and the planner 72, and effectively translates plans of the planner into commands that can be synchronized with, understood by and followed by that control program software. The execution controller 76 also monitors events of the application-specific control program software 46 and, when appropriate, is capable of providing response-context events and other information back to the planner 72 regarding the status of the control program software. Depending upon the embodiment, the execution controller 76 can utilize polling to monitor events of the control program software 46, or alternatively can utilize event driven monitoring.

Figure 5:
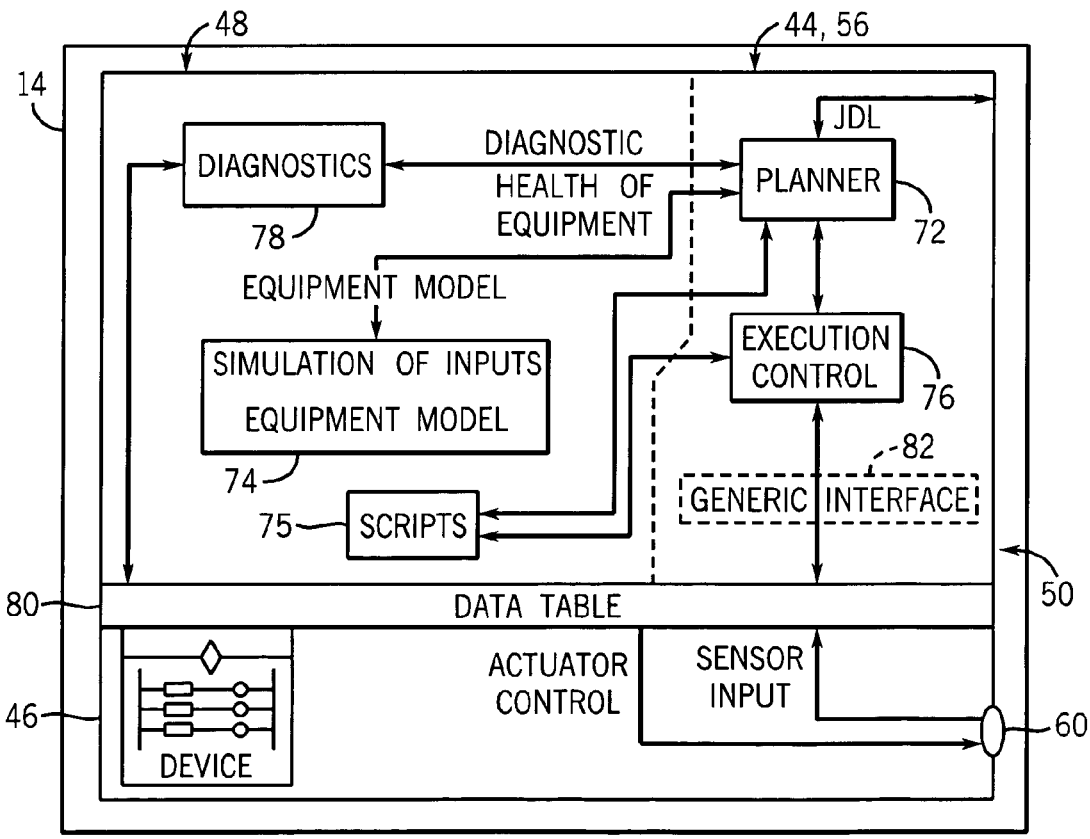
FIG. 5 is a block diagram showing in more detail certain of the software components shown in FIG. 3.

Turning to FIG. 5, the planner 72 of the DCA infrastructure firmware 44 is in direct communication with three different portions of the application-specific agent software 48, namely, an equipment model 74, application-specific agent scripts 75, and a diagnostics portion 78. Additionally, the execution controller 76 of the DCA infrastructure firmware 44 is also in communication specifically with the application-specific scripts 75. In the present embodiment, the scripts 75 are written in the JDL language, while the remainder of the application-specific agent software 48 (like the DCA infrastructure firmware 44) is written using a high-level programming language such as C++ of JAVA, although in other embodiments these portions of the application-specific agent software can take other forms.

The scripts 75 are application-specific agent program instructions that can be accessed by the execution controller 76 and the planner 74 (typically, by way of two dedicated threads) as those components, respectively, determine how to perform certain operations in relation to the application-specific control program software 46 and the controlled machine(s) 12, and plan regarding what actions should be taken in the future in relation to other agents (e.g., whether to initiate bidding) and/or in relation to the application-specific control program software/controlled machines. The equipment model 74 possesses models for use by the planner 72 in evaluating different operational configurations, as well as metrics for those configurations. These models and metrics take into account the characteristics of the particular machine(s) 12 that are being controlled by the agent 50. Thus, the equipment model 74 provides information that allows the planner to make decisions related to the capabilities of the agent 50 and its assigned machine(s) vis-à-vis the other agents of the distributed control system 10 and other machines controlled thereby.

With respect to the diagnostics portion 78, this portion of the application-specific agent software 48 is in communication with the machine(s) 12 that are being controlled and monitored by the agent 50, by way of the control programs 44. The diagnostics portion 78 provides the capability of detecting equipment failures, isolating failures from propagating, and periodically or asynchronously proposing strategies to enhance system performance or avoid undesirable states. To allow it to evaluate the status or health of the machine(s) 12, the diagnostics portion 78 includes one or more models of the machine(s). In certain embodiments, the diagnostic portion 78 additionally includes a suite of data acquisition, signal processing, diagnostic, and prognostic algorithms. These algorithms describe machinery and process health such as machinery fault detection, degraded operation, and failure prediction.

The algorithms and models of the diagnostics portion 78 are organized into a multi-level structure that conforms to the Open Systems Architecture for Condition-Based Maintenance (OSA-CBM) specification. This permits specific routines such as de-noising algorithms, bearing fault detection, or gear failure prediction algorithms to be easily re-used in different agents. The OSA-CBM architecture also provides a mechanism for agents other than the agent 50 to access information about a specific machine component (e.g. bearings) or to request specific information such as the expected machinery health and operating lifetime. With this architecture, the diagnostic portions of each of the agents of the distributed control system 10 can interrogate the diagnostic portions of the other agents to validate a fault hypothesis or to establish the viability of operating under extreme, possibly never anticipated, conditions. For example, a pump agent could sense a higher than normal level of vibration and establish several possible fault hypotheses such as a bad bearing, loose mounting, or fluid cavitation. By employing corroborating information from the diagnostic portions of first and second agents that respectively govern the operation of a motor and a valve, it might be possible to determine that cavitation is occurring.

FIG. 5 additionally shows a particular, preferred mechanism for allowing communications to occur among the application-specific control program software 46, the agent-type programming including each of the application-specific agent software 48 and the DCA infrastructure firmware 44, and the machine(s) 12 controlled by the agent. As shown, in this embodiment, the execution controller 76 and the diagnostics portion 78 of the DCA infrastructure firmware 44 and the application-specific agent software 48, respectively, each are able to communicate with the application-specific control program software 46 by way of a data table 80. In some embodiments, the communication between the execution controller 76 and the data table 80 occurs by way of an additional, generic interface 82 of the DCA infrastructure firmware 44, which is shown in dotted lines to indicate that it is present only in some embodiments. Additionally, sensor signals received from, and actuator/control signals provided to, the controlled machine(s) 12 (collectively shown as input/output signals 60) are provided to and from the application-specific control program software 46 by way of the data table 80 as well.

The data table 80 can be of a standard form as is conventionally available as a data storage area in a conventional industrial controller or similar controller, e.g., the memory 24 shown in FIG. 2. The data table 80 allows communication between the application-specific control program software 46, the application-specific agent software 48/DCA infrastructure firmware 44, and the I/O 60 by providing an array of memory locations that can be monitored and changed by each of the application-specific control program software 48, the diagnostics portion 78, the execution controller 76, and the machine(s) 12 by way of the I/O line(s) 30.

In a preferred embodiment, communication between the application-specific control program software 46 and the application-specific agent software 48/DCA infrastructure firmware 44 occurs as follows. The application-specific control program software 46 monitors values that can be changed by the diagnostics portion 78 or execution controller 76. When these values are varied, the control program software 46 observes this to be the case and accordingly changes its operation in response. Thus, the diagnostics portion 78 or execution controller 76 can control operation of the control program software 46 simply by varying values.

To the extent that the diagnostics portion 78 or execution controller 76 needs to be able to monitor operation of the control program software 46 and the machine(s) 12 controlled thereby, a different process is used. More specifically, in order to allow the control program software 46 to notify the diagnostics portion 78 or execution controller 76 that a value associated with the control program software or machine(s) 12 has changed, the diagnostics portion/execution controller is provided with a special thread that monitors values that are of interest. Then, whenever one of those values changes, an internal notification message is sent to the diagnostic portion 78/execution controller 76 (in FIPA notation, this could also be a subscribe service).

Because of the data table 80, the overall agent 50 (and particularly those of the software components 25 performing agent-type behavior, namely, the DCA infrastructure 44 and the application-specific agent software 48) is capable of not only interacting with the application-specific control program software 46 and the I/O 60 (and thus the controlled machine(s) 12), but also is capable of making decisions based upon these interactions as well as decisions about how to further interact with the application-specific control program software and I/O (and thus the controlled machine(s)). In particular, upon receiving data and other information (e.g., event information) provided onto the data table 80 by the control program software 46 and I/O 60, the application-specific agent software 48 is able to match such received information with one or more of the application-specific agent scripts 75. These scripts 75 in turn further indicate other actions for the agent 50 to perform, and thereby are capable of "gluing" events or data with specified agent functions. Such other actions can include, for example, sending further data, control signals or other information (including, for example, other event information) onto the data table 80 for receipt by the application-specific control program software 46, the I/O 60 and ultimately the controlled machine(s) 12, as well as causing interactions between the agent 50 and other agents, such as initiating bidding with other agents.

Figure 6:
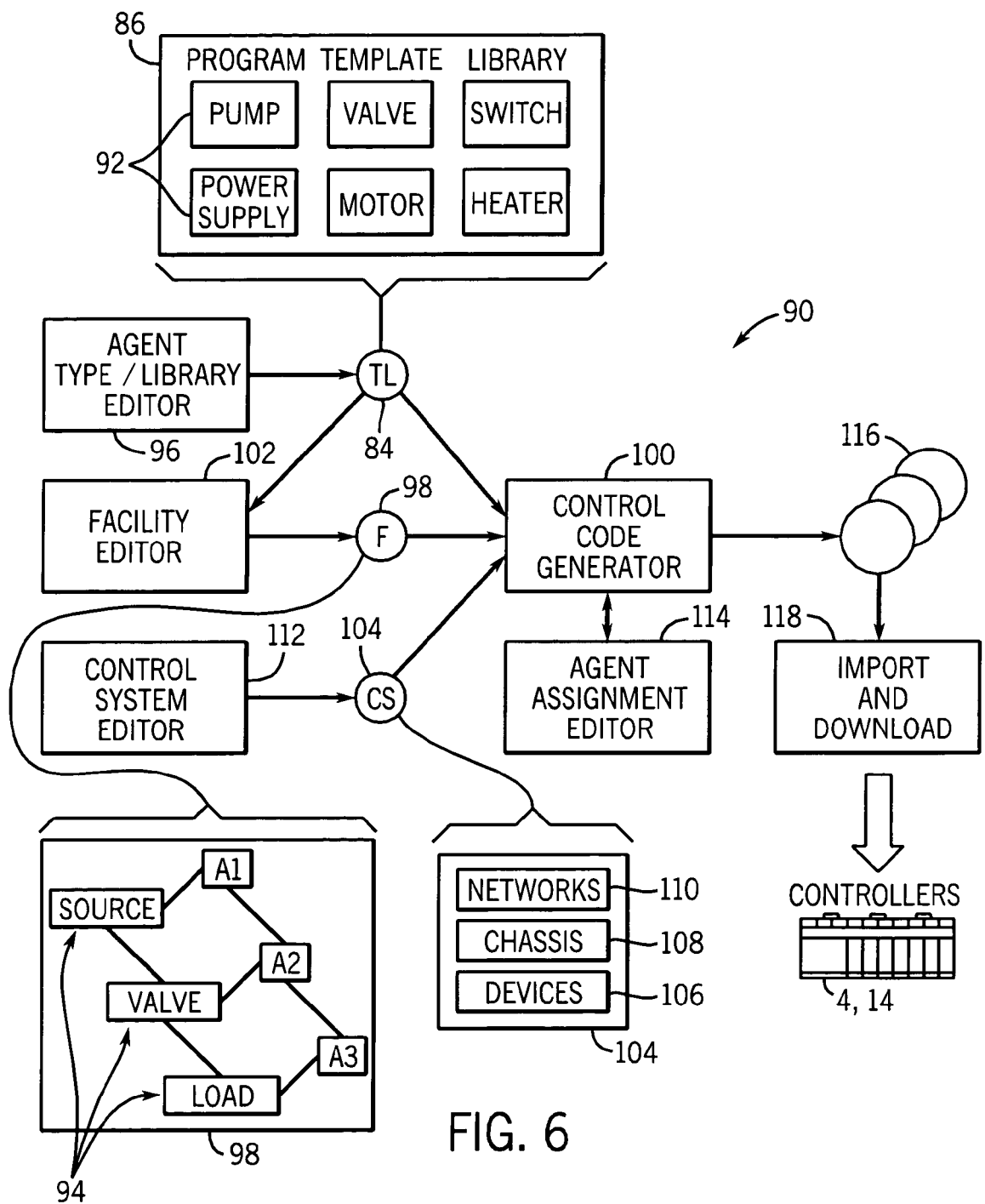
FIG. 6 is a function diagram showing an exemplary process for developing software components for implementation on the controllers of FIG. 1.

Turning to FIG. 6, in accordance with the present invention the controllers 4,14 of the distributed control system 10 can be programmed in a manner that simplifies the integration of agent-type programming with control programming such as conventional ladder logic programming. In a preferred embodiment, the controllers 4,14 of the distributed control system 10 are preprogrammed with those of the software components 25 that are generalized and not application-specific or otherwise specially-configured for operation in relation to particular machines or in relation to a particular controlled process. That is, the controllers 4,14 are preprogrammed with the operating system 40, the base firmware 42, and the DCA infrastructure firmware 44. Using such preprogrammed controllers 4,14, the programming of the distributed control system 10 is then completed by way of a development process performed by a user/programmer through the use of a Development Environment (DE) program 90 as shown in FIG. 6.

Through the use of the DE program 90, the user creates the application-specific agent software 48 and application-specific control program software 46 for each of the agents of each of the controllers 4,14 of the distributed control system. Although typically the DE program 90 assists in the programming of both the application-specific control program software 46 and the application-specific agent software 48, in some embodiments the DE program only assists in the programming of one or the other of these software components. Upon creation of the application-specific agent and control program software 48,46, the DE program 90 then further allows this software to be implemented on the controllers 4,14 of the distributed control system 10 and integrated with the preprogrammed, generalized programming already existing on the controllers. Where appropriate, the DE program 90 automatically configures the application-specific agent software and control program software 48,46 so that it is able to properly operate in conjunction with the DCA infrastructure firmware 44 and the base firmware 42 (as well as the operating system 40). In at least some embodiments, the DE program 90 can be accessed and utilized by a user by way of the HMI 20.

The DE program 90 is a generalized software tool that is capable of being used to program a variety of different distributed control systems that employ a variety of different combinations of agents on a variety of different types and numbers of controllers, in order to control and/or monitor a variety of different types of machine(s) employed to perform a variety of different overall applications. The DE program 90 is configured to allow a user to specify physical and behavioral aspects of a distributed application in a manner that is generally independent of the specific characteristics of the control system that is to be employed. Also, the DE program 90 is designed to enable a user to specify a multi-processor control system in a manner that is generally independent of the application that is to run on it. Further, the DE program 90 is configured to assist the user in combining an application with a control system, which can include combining the software code for multiple agents associated with a single controller, augmenting the programming of each controller automatically to handle communications with other controllers as a result of the program distribution, and communicating with all of the controllers involved in a distributed control system in order to program, configure, monitor, and edit the programming at those controllers.

Referring still to FIG. 6, in the present embodiment the DE program 90 provides one or more template libraries 84 providing one or more program templates 92 that can be used to create the application-specific control program and agent software 46,48. Through the use of an agent type/library template editor 96, a user is able to select and edit/modify each of these templates libraries 84, and the templates 92 within the libraries, in order to develop customized software for the particular application, agents, controller configuration and machine(s) that are being controlled and/or monitored. In particular, the template editor 96 allows a user to view various types of information such as agents' capabilities and various variables/tags associated with those agents. Additionally, the template editor 96 allows a user to configure or customize various aspects of the templates 92 for the particular application, for example, by modifying various tags or capabilities/parameters shown in the templates.

Each of the program templates 92 typically includes both application-specific control program software and application-specific agent software. For example, in some embodiments the program templates 92 include both C++ code (or other high-level language code) that constitutes a template portion for the application-specific agent software 48, and ladder logic code (or code using some other appropriate language) that constitutes a template portion for the application-specific control program software 46. Portions of templates, including templates from different libraries, can be combined and modified in a variety of ways by the user to arrive at desired program templates. For example, templates 92 from different template libraries 84 can be used for different agents for the same distributed control system. Also, in some cases, the application-specific agent software portion of one template will be combined with the application-specific control program software portion of another template, in order to form a new template.

As stored in the template library 84, the templates 92 are generic with respect to classes of agents and controlled machines. For example, as shown, the templates 92 can include a "valve" template relating to the control of valves and a "switch" template relating to the control of switches. In a preferred embodiment, the templates 92 take the form of objects, such that object-type properties such as inheritance are supported by the templates. Thus, if a user specifies that a particular template is a form of another type of template, then instances of the former template take on characteristics of the latter template. For example, if the user specifies that "a ball valve is a type of valve", then each instance of a ball valve will inherit all of the ladder data definitions and agent logic associated with a valve.

Although, in the present embodiment, a user preferably creates the application-specific control program and agent software 46,48 by way of selecting among the templates 92 and modifying those templates as appropriate, it nevertheless also remains possible for the user to create templates or program portions entirely from scratch, and/or to forgo the use of templates (and, in some embodiments, templates are not available).

The DE program 90 additionally makes available a facility editor 102 that can be utilized to display a facility 98, which is a tree, map, outline or other diagrammatic representation of the process that is to be controlled by the distributed control system 10 being designed. In particular, the facility 98 shows the components 94 (e.g., the controllable machines 12) that are to perform the process, and that are to be controlled by the various agents being designed using the agent type/library editor 96. The facility 98 can be created by the user or, in some embodiments, downloaded from another source or automatically generated based upon information concerning a real-life process.

The facility editor 102 in particular enables a user to associate various programming developed by way of the agent type/library editor 96 with the various components 94 shown on the facility 98. That is, after the user has selected and configured/customized the program templates 92 using the agent type/library editor 96, the DE program 90 allows the user to associate the finalized program templates with the various components 94 (e.g., the machines 12) as represented on the facility 98. Once the user has designed the facility 98, and associated appropriate template information with the various components 94 shown on the facility 98, the facility 98 and related template information from the template library 84 are provided to a control code generator 100.

Further as shown in FIG. 6, in addition to receiving information corresponding to the facility 98, including relevant template information from the template library (or libraries) 84, the control code generator 100 additionally receives control system information 104. The control system information 104 includes device information 106 that is representative of the particular controllers 4,14 that are to be used in implementing the distributed control system 10, including information concerning the hardware (and, potentially, firmware) features of those controllers. The control system information 104 also includes information regarding other hardware to be utilized in the distributed control system 10 including network information 108 and chassis information 110 (e.g., information regarding a backplane or other hardware/firmware structures being employed). The particular structures included within the control system information 104 can be specified or selected (e.g., from a list of available structures) by the user by way of a control system editor 112.

Upon receiving the device information 106 regarding the controllers to be employed in the distributed control system 10, the DE program 90 additionally provides an agent assignment editor 114 by which the user is able to specify the correspondence between the finalized agent templates associated with the facility components 94 and the controllers specified by the device information 106. Thus, specific agents are assigned to specific controllers. In particular, as noted above, while commonly one agent will be implemented on each of the controllers 4,14, it is also possible for a given controller to have multiple agents implemented on it. Further, it is possible that certain controllers existing in a distributed control system will not have any assigned agents.

Once the agent assignments are made via the agent assignment editor 114, the control code generator 100 compiles the software code embedded in the templates 92 as appropriate given the interrelationships represented by the facility 98, control system information 104 and agent assignments, and thereby produces executable application-specific control program software and agent software 46,48. In particular, the control code generator 100 automatically instantiates the templates 92 to produce the application-specific control program software and the application-specific agent software 46,48, which involves configuring the templates 92 (e.g., the capabilities and tags of the templates) so that the resulting software is capable of operating in relation to the particular controllers 4,14 and other hardware specified by the control system information 104, as well as capable of controlling and/or monitoring the machine(s) 12 and capable of interacting with one another. This instantiation also can include, in some embodiments, configuration of the templates 92 for operation in relation to the base firmware 42 and the DCA infrastructure firmware 44 (and operating system 40) implemented on the controllers 4,14.

The instantiated, executable application-specific control program and agent software 46,48 produced by the control code generator 100 is stored in a memory 116 (e.g., of the HMI 20). Then, that software is imported and downloaded (as represented by block 118) to the various controllers 4,14, where the downloaded software is integrated with base firmware 42, DCA infrastructure firmware 44 and operating system 40 on the controllers.

Because the data needed by any given controller within a distributed control system is often distributed at different locations/controllers, the DE program 90 further automatically configures the software (e.g., when it is implemented on the various controllers) to allow for appropriate communication of data between controllers. In a preferred embodiment, the software is configured so that data is periodically and continually transferred to locations at which it is needed, so that from the perspective of a given controller (or agent implemented on a given controller) all data that is needed for operation appears to be locally available. Insofar as communication protocols such as ControlNet allow for two types of data communication, a first "I/O" type of data communication that is periodic and continual and a second "messaging" type of data communication that is on demand, data communications among controllers generally occurs in accordance with (or at least in a manner similar to) the first type of communication. This is in contrast to the JDL/FIPA messages discussed above, which generally occur in accordance with the second type of communication.

Although the present embodiment envisions the use of a DE program 90 by way of a user interface such as the HMI 20 that is electronically or otherwise in direct (or even real-time) communication with other components of the distributed control system being programmed, this need not be the case. For example, in certain embodiments, the DE program 90 is utilized by a technician to develop application-specific control program and agent software at a location that is remote from, and not in direct communication with, the distributed control system on which that software is to be eventually implemented. Upon completing the software, the technician may record the software on a disk, cartridge, card, chip, or other memory device that can at a later time be plugged into or otherwise coupled to one or more of the controllers 4,14, the network 16, the HMI 20 or other portion(s) of the distributed control system 10. The controllers 4,14, can be industrial or other controllers having a port to receive such memory device(s), which in some embodiments constitute retrofitting devices. In other circumstances, the application-specific control program and agent software can be developed automatically by a computer.

Figure 7:
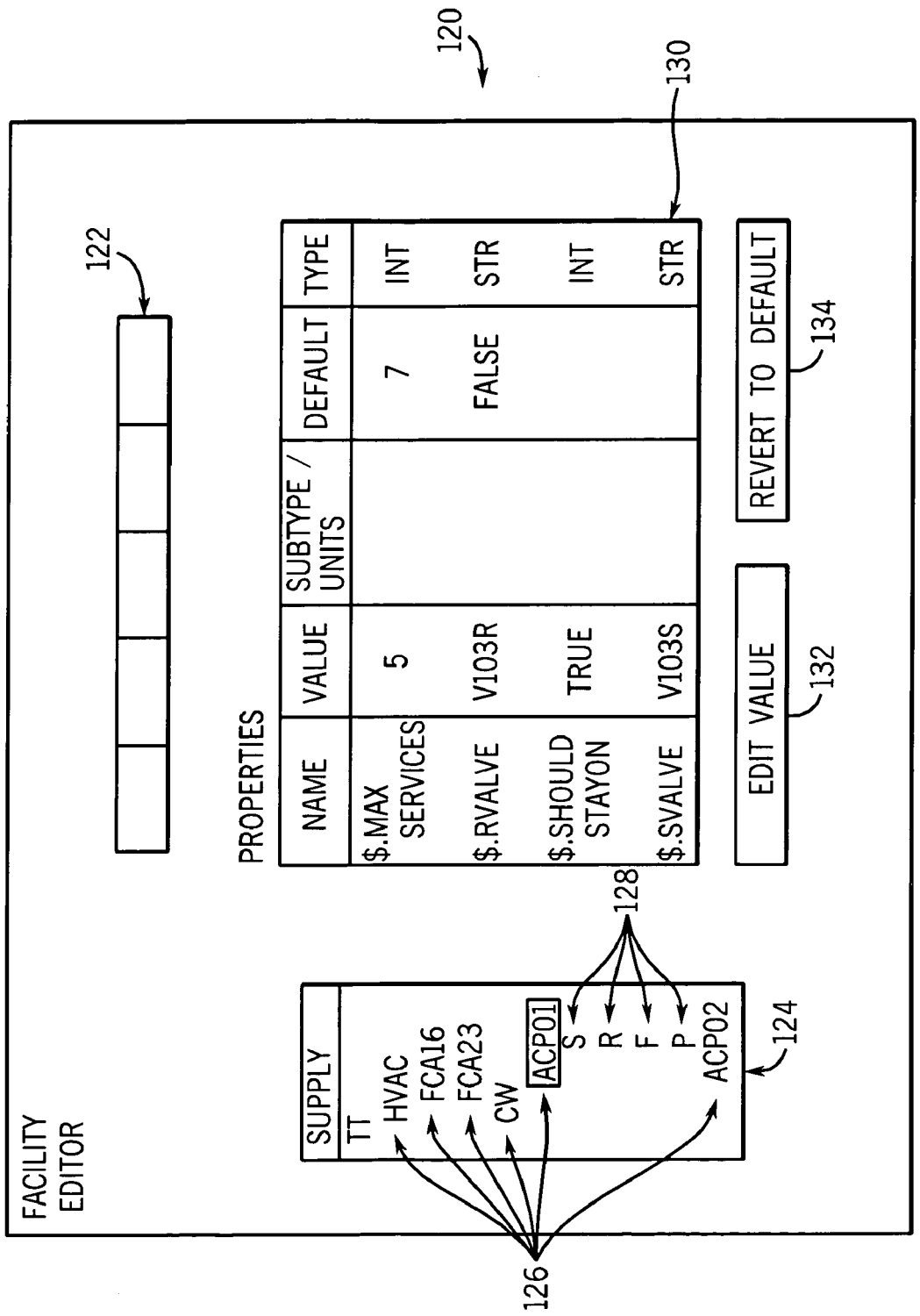
FIGS. 7-12 show exemplary screens of a human-machine interface by which a user can develop software components in accordance with the process of FIG. 6.

Referring to FIGS. 7-12, exemplary screens are provided of an exemplary version of the DE program 90 being employed to develop a multi-agent system using the HMI 20. FIG. 7 in particular shows a first, facility editor screen 120 provided using the facility editor 102. As shown, the facility editor screen 120 displays in a box 124 various instantiated templates 126 of an exemplary facility (e.g., one example of the facility 98 discussed with reference to FIG. 6) that is being developed using the facility editor 102. In this example, the facility is a tabletop (TT) chilled water system, and the components that have been added to the facility include, for example, an "ACP01" component that is an instance of an agent template of the "Supply" type/class.

Because the ACP01 component has been selected by a user (and consequently is shown to be highlighted), its agent template class (Supply) is displayed at the top of the box 124, and additionally various services 128 associated with the ACP01 component are also displayed in the box 124. Insofar as, in the present example, the ACP01 component is a water supply, the services 128 associated with that instance concern possible functions of a water supply such as water flowing through different ports and various sensory measurements.

Additionally, the facility editor screen 120 includes a box 130 in which can be displayed various properties of one of the agent type instances displayed in the box 124. For example, because the ACP01 component has been selected/highlighted, the properties corresponding to that instantiated agent template are displayed in the box 130. Additionally, one or more of the properties displayed in the box 130 typically can be specified/modified by the user. In this example, name, value, subtype/unit, default, and type information is provided in relation to four different properties. By selecting one of the properties and further selecting an edit value button 132, a user is given the opportunity to change certain of the property information, for example, the value information. A further revert to default button 134 allows a user also to return certain property information to a default value/status. Depending upon the embodiment, the facility editor screen 120 also can include other user-selectable buttons 122.

Figure 8:
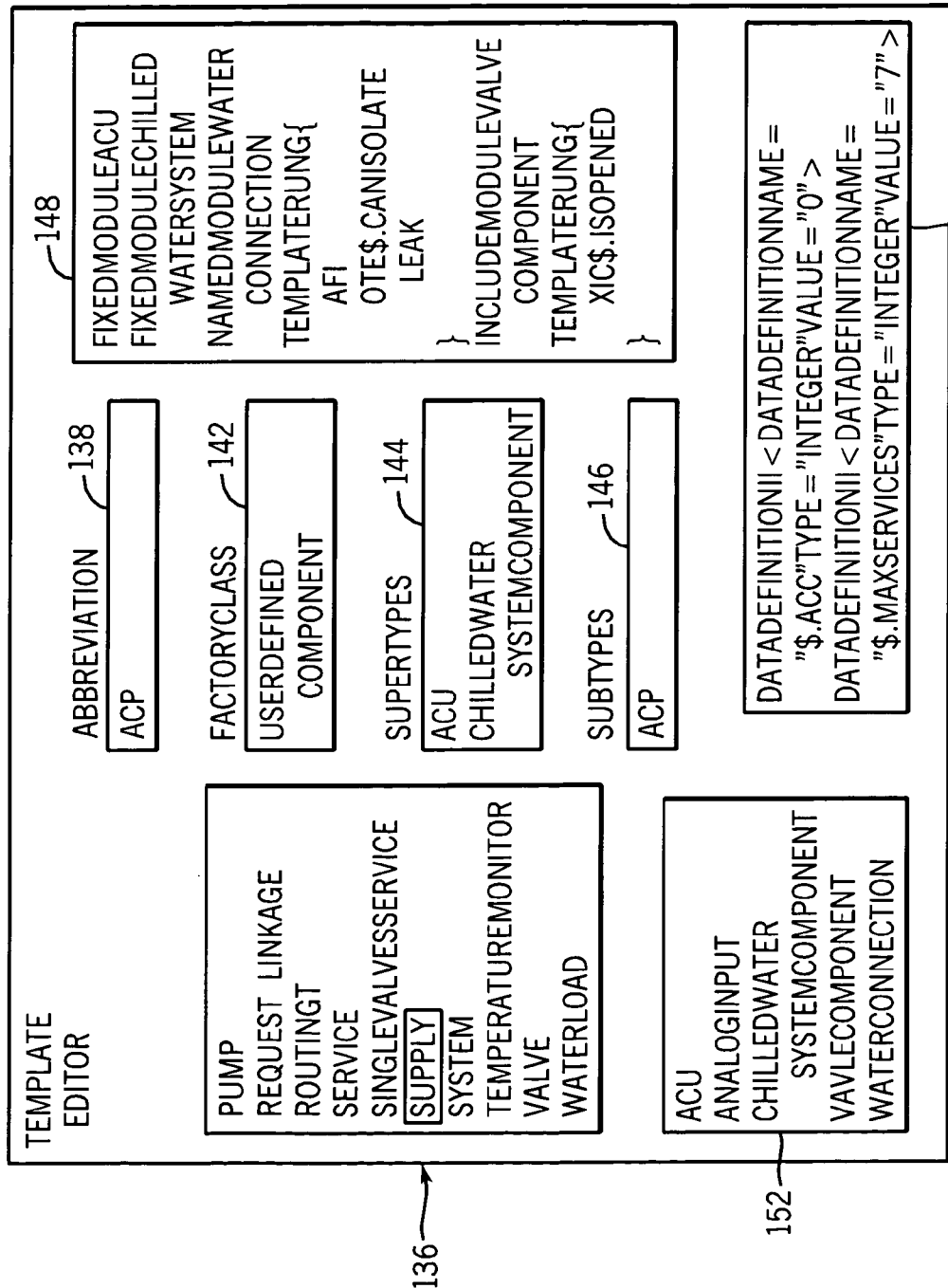
Figure 9:
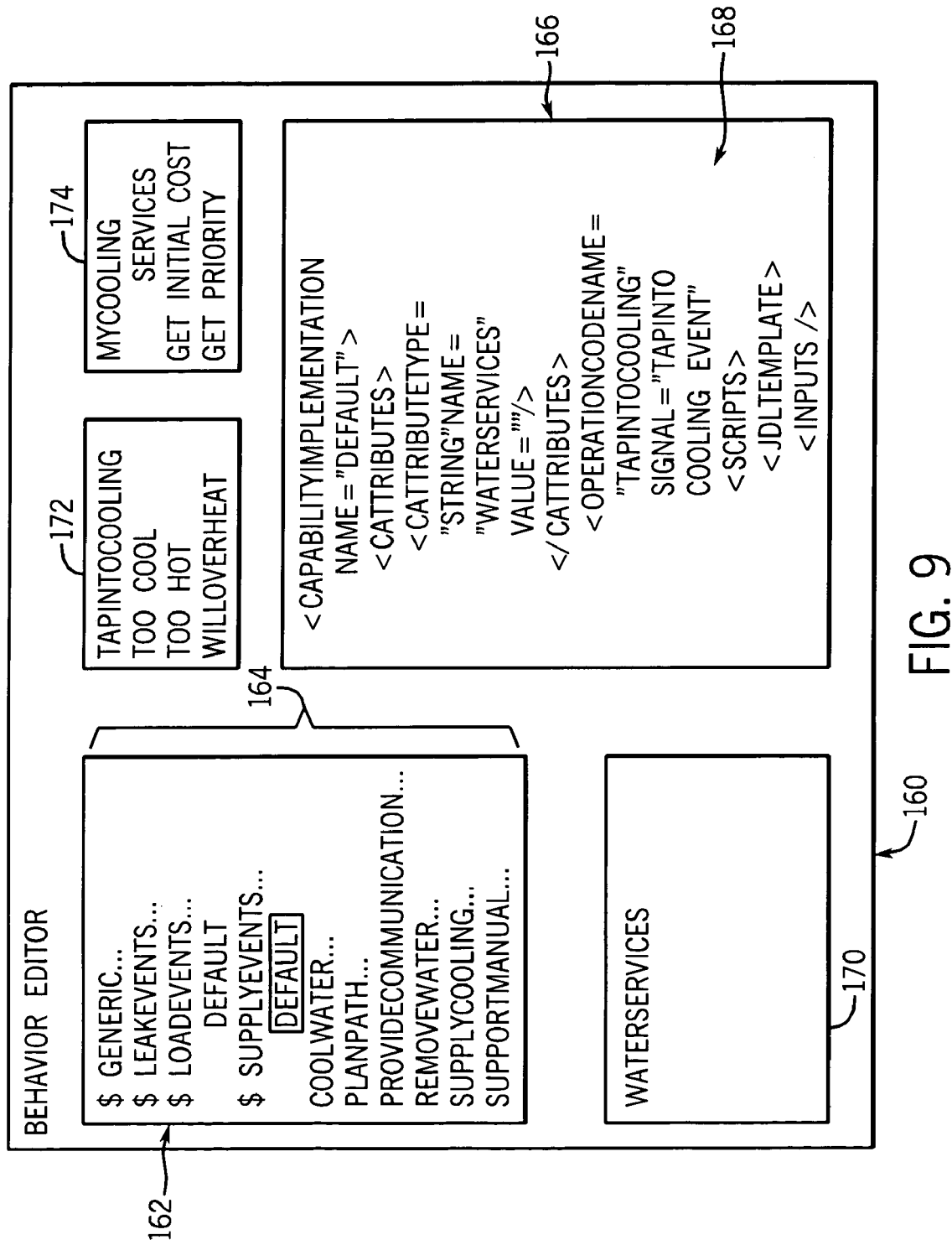

Turning to FIGS. 8 and 9, a second, template editor screen 140 and a third, behavior editor screen 160 are shown. Each of the template editor and behavior editor screens 140,160 are provided as parts of the agent type/library editor 96. While the second, template editor screen 140 provides an interface by which a user can select/specify/modify non-agent programming and other information for agent template classes (e.g., the application-specific control program software 46 discussed above), the third, behavior editor screen 160 provides an interface by which a user can select/specify/modify agent-related programming and other information for the agent template classes (e.g., the application-specific agent software 48 discussed above).

Specifically with respect to FIG. 8, the template editor screen 140 in a box 136 lists all of the available agent template classes within a selected template library. By selecting one of the agent template classes (in this case, "Supply"), the screen further displays various information regarding that class of agent template in second, third, fourth and fifth boxes 138, 142, 144 and 146, respectively. In particular, a second box 138 displays an abbreviation for the selected template class, while a third box 142 displays a factory class corresponding to the selected template class. Thus, in this example, an abbreviation "ACP" for the selected template class "Supply" is displayed in the second box 138, and a factory class "USERDEFINED COMPONENT" for the selected template class is displayed in the third box 142.

Also displayed, in a fourth box 144 and a fifth box 146, respectively, are supertype and subtype template classes corresponding to the selected template class. If a first template class is a supertype of a second template class, then the second template class is a subtype of the first template class or simply of the type of the first template class. Multiple inheritance among different classes is supported. Thus, as shown, the selected template class "Supply" is a subtype of the both of the supertype template classes "ACU" and "ChilledWater System Component", while the template class "ACP" is a subtype of the selected template class.

Additionally, the template editor includes a sixth box 148 that shows a pseudocode representation of various ladder logic associated with the selected template class, a seventh box 150 in which are displayed various tags associated with the selected template class, and an eighth box 152 showing components of the selected template class. By clicking on various information shown in the boxes 138-152, a user can edit these types of programming/information pertaining to the selected template class. In this manner, the template editor screen 140 allows a user to edit non-agent portions of the agent templates, e.g., ladder logic code, data table memory locations, and certain relationships with respect to other templates. In particular, the user can specify and modify the ladder logic code displayed in the sixth box 148. If another one of the template classes listed in the first box 136 is selected, other information corresponding to the selected template class appears in the second through eighth boxes 138,142,144,146,148,150 and 152.

As for the third, behavior editor screen 160 shown in FIG. 9, this screen lists in a first box 162 various capabilities 164 of a selected template class that can form the basis of the application-specific agent software 48 (or a portion thereof). Each of the capabilities 164 is defined by a set of operations (which are not editable by way of the screen 160, but can in some embodiments be edited using another screen), and each of the capabilities 164 typically can take on any of a number of different implementations that also can be listed if the user selects that capability on the screen. For example, as shown in FIG. 9, the capability SUPPLYEVENTS has been selected and an implementation DEFAULT is listed. By way of another screen (not shown), one or more of the capabilities and related implementations can be assigned by a user to one or more of the template classes to define those template classes (particularly in terms of their agent-type behavior). During that assignment process, a user assigns one or more capabilities to a template class and then, for each assigned capability, selects an implementation for that capability.

When a particular implementation associated with a particular capability has been selected on the screen 160, other boxes on that screen show various items that define that implementation and the capability with which that implementation is associated. For example, as shown in FIG. 9, the implementation DEFAULT associated with the capability SUPPLYEVENTS has been selected and consequently, in a box 172, a list of operations corresponding to that capability is displayed and, in addition, (in outline form) a set of scripts and steps within the scripts are displayed that define the behavior of that implementation. Additionally, a box 174 contains a list of local functions that can be performed by an agent configured according to the selected implementation and capability. Such local functions typically are short functions written in a language such as C++, e.g., functions that allow for the accessing of a data table or perform certain calculations. Further, in a box 170, any types of data declared by a user to exist in "agent memory" rather than in a data table is displayed. Finally, in a box 166, a complete listing of agent-type code 168 pertaining to the selected implementation/capability (and corresponding to the information in the other boxes on the screen 160) is displayed, in this example, in XML.

Figure 10:
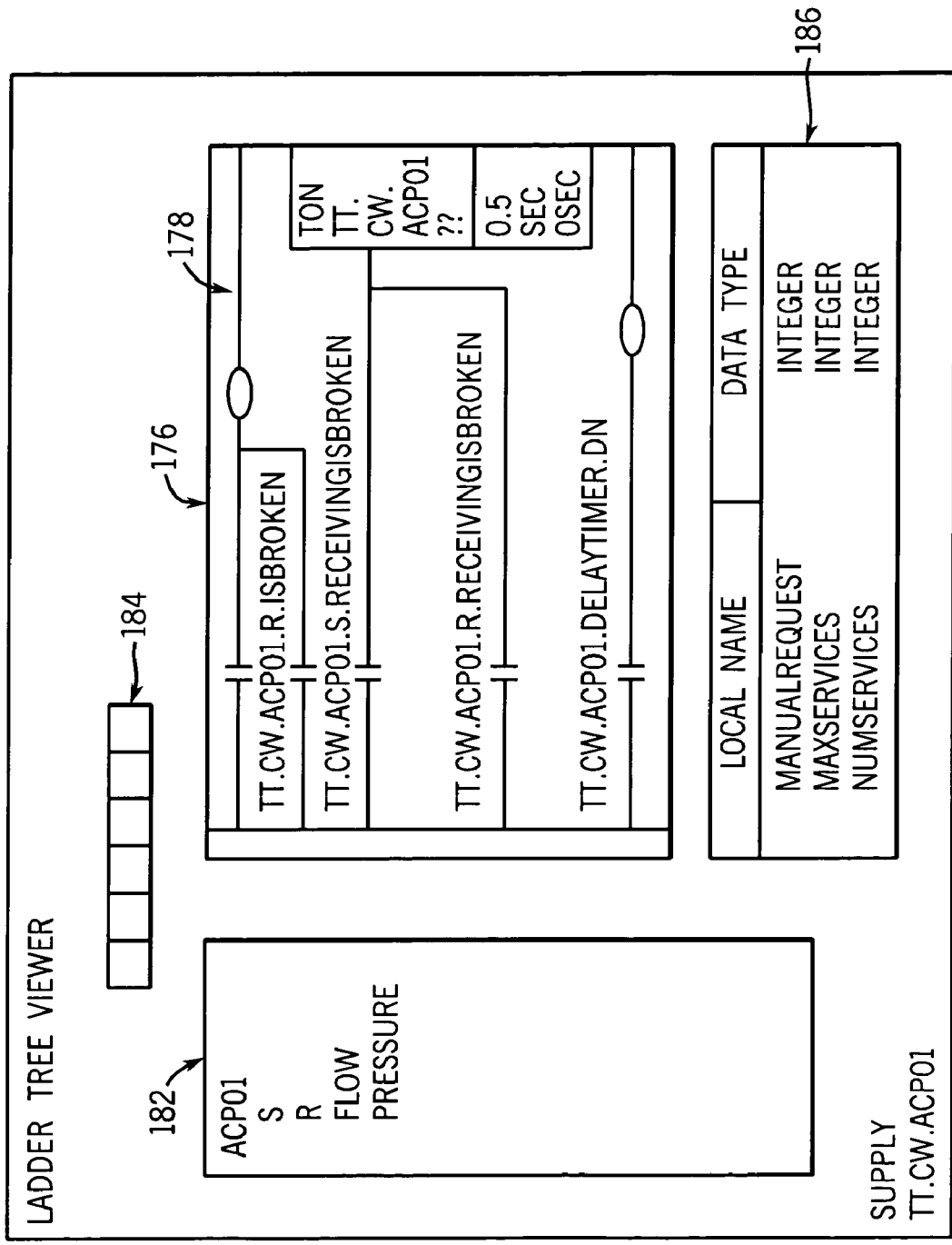

Although the template editor screen 140 shown in FIG. 8 allows a user to add to and/or edit the ladder logic code of an agent template class (as listed in the sixth box 148 of that screen), as shown in FIG. 10 an additional, fourth, ladder tree viewer screen 180 also can be brought up by a user to view (in a read-only format) the ladder logic code of a given instantiated agent template. As shown, the ladder tree viewer screen 180 includes a first box 176 in which ladder logic code 178 of a selected instantiated agent template specified in a second box 182 (e.g., in this example, the instantiated agent template "ACP01"). Further, in a third box 186, the variables/tags referenced by the ladder logic code 178, along with information concerning those variables/tags (e.g., data type), are displayed. In contrast to the manner in which the ladder logic code is displayed in FIG. 8 (e.g., in a textual, pseudocode format), the ladder logic code in FIG. 10 is displayed in a graphical format. However, depending upon the embodiment, the manner of display of the ladder logic code on each of these screens can vary (for example, the ladder logic code could be displayed in FIG. 8 in a graphical format).

Figure 11:
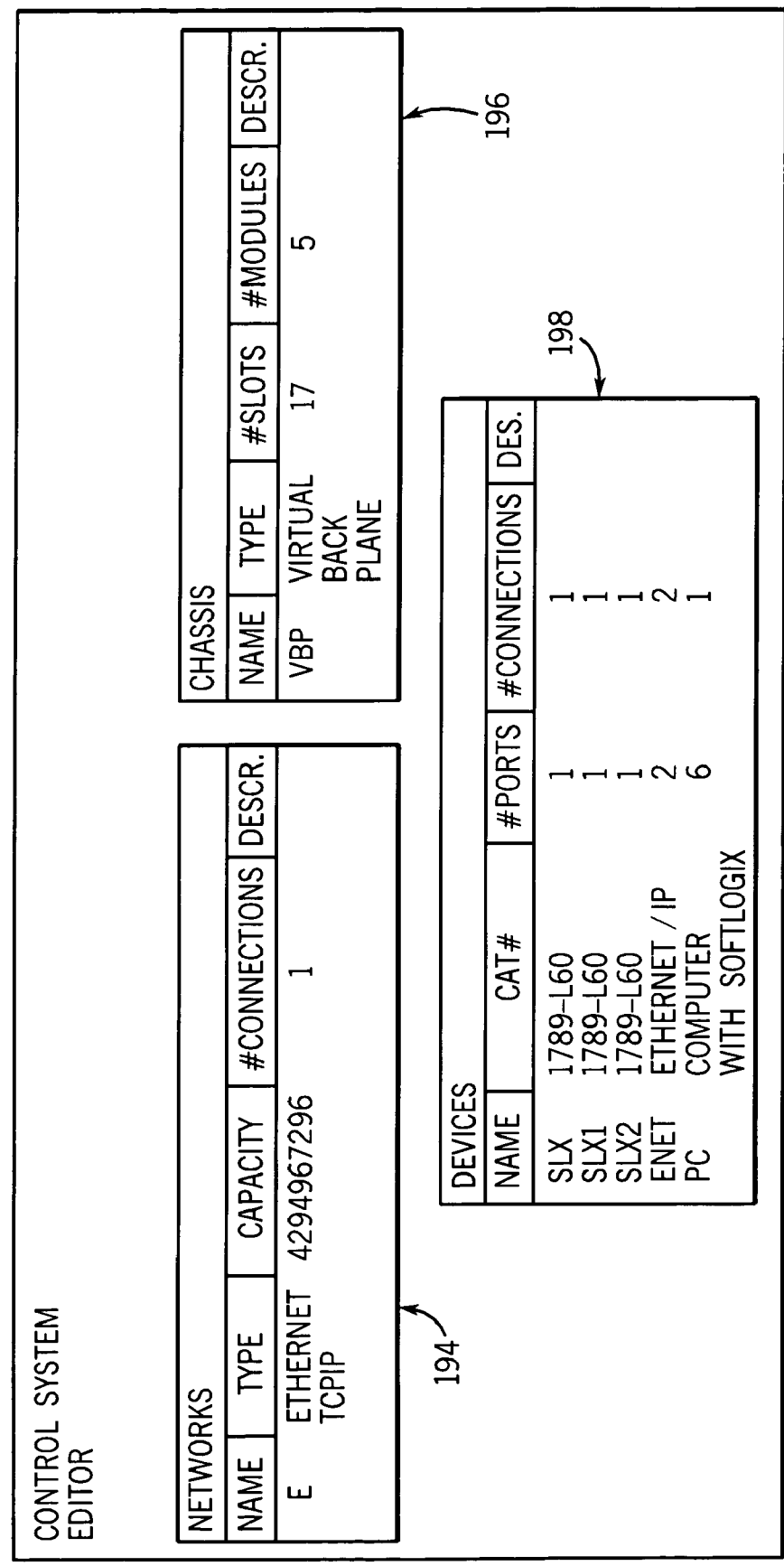

Turning to FIG. 11, a fifth, control system editor screen 190 that includes, in first, second and third boxes 194, 196 and 198, respectively, the types of network(s), chassis component(s) and device(s) that are available for implementing the distributed control system being developed. More specifically, the first box 194 shows network information including names of available networks, as well as the type, capacity, connectivity and other descriptive information regarding each available network. The second box 196 shows names of available chassis components (e.g., hardware/firmware components other than networks or processors such as a virtual backplane), as well as type, slot, module and other descriptive information regarding those components. The third box 198 shows names of available processors and other devices (e.g., communication cards and I/O cards), as well as catalog, port, connectivity and other descriptive information regarding those processors. A user can add information regarding other structures to the boxes 194, 196 and 198 by importing/downloading such additional information, or delete structures from the boxes.

Figure 12:
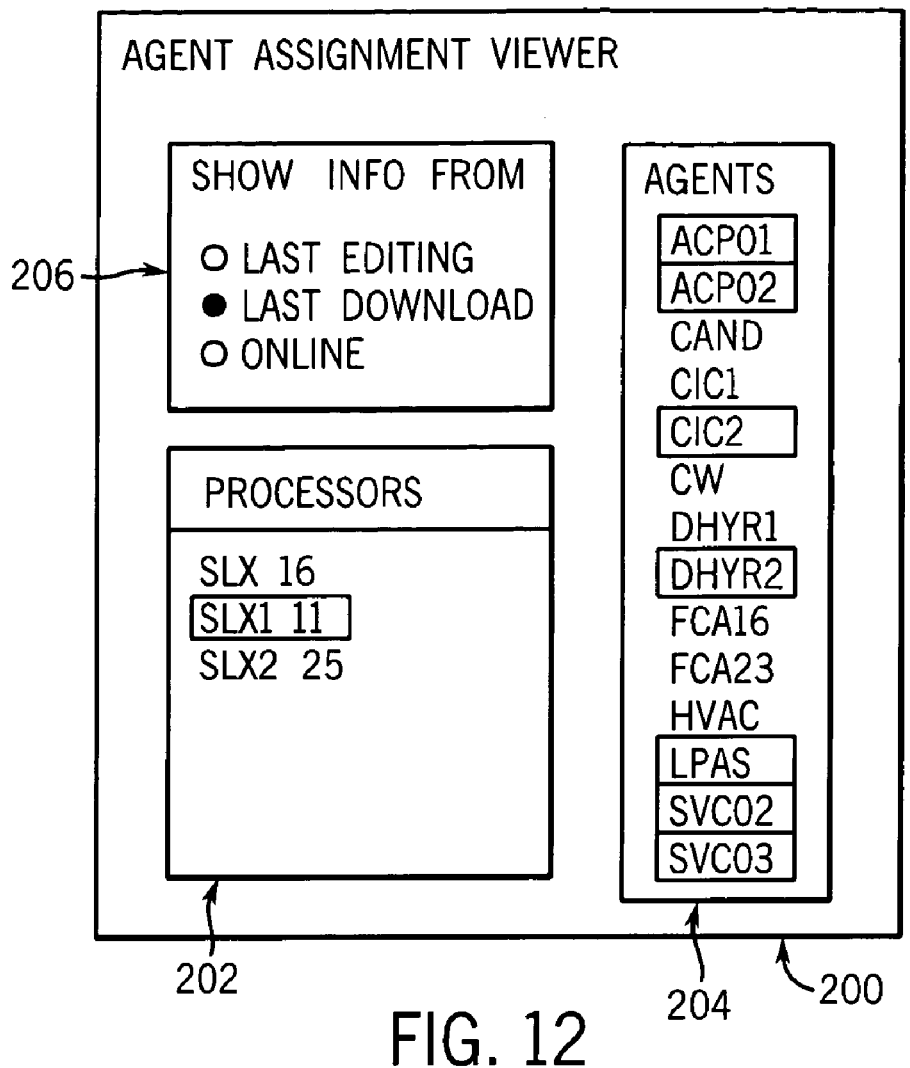

Turning to FIG. 12, a sixth, agent assignment viewer screen 200 is shown that allows a user to view how agent template instances have been assigned to various processors (or other devices) of a distributed control system, such as those shown in the box 198 of FIG. 11. In the embodiment of FIG. 12 in particular, the screen 200 includes a first box 202 that lists all processors (or other devices) to which agent template instances have thus far been assigned, along with the number of agent template instances that have been assigned to each of those processors (or other devices). A second box 204 lists all of the agent template instances that have been assigned. When a user selects one of the processors (or other devices) of the first box 202, the agent template instances shown in the second box 204 that have been assigned to that processor (or other device) are highlighted. For example, as shown, when the processor SLX1 is selected in the first box 202, each of the agent template instances ACP01, ACP02, CIC2, DHYR2, LPAS, SVC02 and SVC03 become highlighted since each of those agent template instances has been assigned to that processor. A third box 206 further allows a user to choose between various sources of information.

A user can interact with the screens 120,140,160,180,190 and 200 of the DE program 90 in a variety of manners, and can move among the different screens in a variety of manners. In some circumstances, one or more of the screens (for example, the sixth screen 200) can "pop up" automatically as a user interacts with the DE program 90, e.g., as part of an automatic or "wizard-type" process. Also, a user can command certain of the screens to pop up. For example, a user can bring up the template editor screen 140 from the facility editor screen 120 by "right-clicking" a mouse (not shown) on a selected template instance displayed on the facility editor screen 120 (e.g., the ACP01 instance shown in FIG. 7) and then further selecting a template editor choice from a drop-down menu (not shown) that appears in response. When this is done, the template editor screen 140 will appear and, further, the "Supply" template class will automatically be selected on that screen since the ACP01 instance selected in FIG. 7 is an instance of that template class. Similarly, a user can also bring up either of the behavior editor and ladder viewer screens 160,180 by making appropriate selections from a drop-down menu that appears in response to the user right-clicking on a selected template instance displayed on the first screen 120.

The DE program 90 and exemplary screens 120,140,160, 180,190 and 200 described above with reference to FIGS. 6-12 are, in the present embodiment, intended to be used to create, modify and instantiate composite agent templates having both agent-related and non-agent programming/information and then to implement those instantiated templates onto specific controllers and/or other hardware components of a distributed control system. Nevertheless, in alternate embodiments, the DE program 90 is also capable of being employed in programming distributed control systems even when the control programming/information being implemented on the controllers/hardware components of the control system does not include both agent-related and non-agent programming/information.

For example, the DE program 90 could be utilized simply to program ladder logic onto controllers by way of the facility editor screen 120, the template editor screen 140, and the control system editor screen 190 (and possibly the ladder tree viewer 180), without utilizing the capabilities of the behavior editor screen 160. Thus, the present invention is intended, in at least some embodiments, to encompass usage of the DE program 90 or any portions thereof to program distributed control systems, regardless of the specific type(s) of template(s), programming, hardware, or facility component(s) that are involved.

Figure 13:
FIG. 13 is a block diagram showing exemplary steps of operation of the controllers of FIG. 1 by way of the software components shown in FIGS. 3-5.

Turning to FIG. 13, once the distributed control system 10, and in particular the controllers 4,14 of the distributed control system, have been programmed with a distributed application using the DE program 90, the distributed control system is capable of operating and, in particular, capable of controlling and/or monitoring the machines 12. The operation of the agent 50 of the controller 14 and other agents at the other controllers 4 (as well as, possibly, other agents at the controller 14 or at external organizations) typically includes three phases in which the agents communicate with one another to collaboratively address system needs. These phases are a creation (or planning) phase 208, a commitment phase 210, and execution phase 212.

During the creation (or planning) phase 208, one or more of the agents of the various controllers 4,14 initiate a collaborative decision-making process. Typically, this occurs when one or more of the agents determine that a system need has arisen. Upon determining that a need has arisen, the one or more agents issue a request for bids to other agents. In response, others of the agents supply bids back to the requesting agent(s). In the present embodiment, these bid requests and bid messages among the agents are in the JDL language, although in alternate embodiments other languages can be used. Also, in certain embodiments, the ContractNet protocol is used to perform these dynamic negotiations. Further, the bids supplied back to the requesting agent(s) in some cases are formed by way of further subcontracting that occurs between certain of the agents, typically by way of additional bid requests/bids. This subcontracting occurs through the use of the subcontracting management algorithms of the planner 72 as discussed above.

The agents typically determine whether they can bid, and how much they can bid, based upon their respective application-specific agent software 48, which can employ a variety of decision-making algorithms such as, for example, algorithms that employ money-type rules or pricing-type rules. The determinations by the agents also are based upon various information that is accessible to the agents including, for example, information regarding the capabilities of the machine(s) controlled by the agents, information regarding their respective capabilities as agents, and information regarding the capabilities of other agents, the last of which can be made available by way of the directory facilitators 62 as discussed with reference to FIG. 4.

When an agent such as the agent 50 accepts a request, an instance of a plan template is created by the planner 72 to record values emerging during the planning process. Information is encoded as a sequence of hierarchical actions with possible precedence constraints. Once a satisfactory solution has been identified (or, in the case of multiple possible solutions, once a preferred solution has been identified), the agents commit their resources to achieve the task in the future, in the commitment phase 210. Further, once the commitment phase 210 is completed, the agents carry out the execution of the plans during the execution phase 212.

Although in some embodiments the commitment phase 210 begins and is completed immediately or nearly immediately upon completion of the creation phase 208, in other embodiments, the agents remain in the commitment phase for a significant amount of time. This can be the case, in particular, where scheduling of agent operations is important. In these circumstances, it sometimes is desirable for agents to delay the commitment of their resources for periods of time before finally committing those resources, in order to retain the options of utilizing those resources for various different operations. Thus, in these embodiments, agents are provided with an additional degree of freedom of operation insofar as the agents need not instantaneously decide how they wish to commit their resources during the commitment phase 210.

It is specifically intended that the present invention not be limited to the embodiments and illustrations contained herein, but include modified forms of those embodiments including portions of the embodiments and combinations of elements of different embodiments as come within the scope of the following claims. For example, it will be understood to one of ordinary skill in the art that the function responsibilities of different software and hardware components discussed above can in some cases be moved from one component to another, that software shown to be firmware in some embodiments need not be firmware, and that the invention should not be considered to be limited to the particular functional divisions discussed above except insofar as it is essential to the purposes described herein.

We claim:

1. A controller configured to operate as at least one agent, the controller comprising: at least one processing device; and at least one storage medium that is in communication with the at least one processing device, wherein the at least one storage medium stores a plurality of program portions that are executed by the at least one processing device, and wherein the plurality of program portions includes a first program portion capable of generating first signals that are commands to be provided to a controlled device; and a second program portion capable of governing standard agent-type functionality; and a third program portion capable of governing application-specific agent-type functionality,
> wherein the second program portion includes a planner that governs at least a portion of the standard agent-type functionality including creating and interpreting bid request messages and bid messages,
> wherein the second program portion includes an execution controller that governs at least a portion of the standard agent-type functionality including translating plans of the planner into commands that can be provided to the first program portion, and
> wherein the execution controller also monitors the first program portion and is capable of providing information regarding a status of the first program portion to the planner.

2. The controller of claim 1, wherein the controlled device is utilized to perform a portion of an industrial process, the controller is an industrial controller, and the first program portion is a control program portion.

3. The controller of claim 2, wherein the control program portion is written in ladder logic code.

4. The controller of claim 1, wherein the plurality of program portions additionally includes a fourth program portion that is base firmware stored in a read-only memory of the at least one storage medium, and wherein the base firmware is capable of receiving the first signals from the first program and formatting the first signals for transmission to the controlled device.

5. The controller of claim 1, wherein the second program portion includes firmware extension programming.

6. The controller of claim 1, wherein the monitoring of the first program portion by the execution controller occurs by way of at least one of polling the first program portion, event-driven monitoring, and sensing events that occur in relation to the first program portion.

7. The controller of claim 1, wherein the monitoring of the first program portion occurs by way of at least one of a generic interface that is also part of the second program portion and a data table.

8. The controller of claim 1, wherein the bid request messages and bid messages include scripts written in a language selected from the group consisting of JDL, XML and KQML.

9. The controller of claim 1, wherein the planner includes at least one of parsing/integration programming that allows the planner to process the bid request messages and bid messages, and subcontracting management programming.

10. The controller of claim 9, wherein the planner further includes wrapping/unwrapping software for formatting at least some of the bid request messages and the bid messages in accordance with a FIPA protocol.

11. The controller of claim 1, wherein the second program portion is capable of governing a downloading of at least some of the third program portion from a source other than the controller during development of a distributed control system of which the controller forms a part.

12. The controller of claim 11, wherein the second program portion further allows for remote activation and deactivation at least some of the agent-type functionality of the controller.

13. The controller of claim 1, wherein the second program portion operates in a priority-based manner and employs a Common Industrial Protocol, and wherein the controller serves as a bridge device between standard industrial networks and packing protocols and multi-agent system communication languages and logical networks.

14. The controller of claim 1, wherein the second program portion includes at least one directory facilitator.

15. The controller of claim 14, wherein each directory facilitator is capable of accessing a first data portion in which addresses corresponding to a first plurality of agents are listed, and a second data portion in which capabilities corresponding to a second plurality of agents are listed.

16. The controller of claim 15, wherein the second program portion includes both a local directory facilitator and a global directory facilitator, wherein the directory facilitators are permanent and generic components, and wherein the controller has employs any of a variety of protocols to organize intercommunications among the directory facilitators.

17. The controller of claim 15, wherein the second program portion includes a capability matcher that is capable of monitoring interactions among agents and identifying related clusters of agents.

18. The controller of claim 17, wherein the third program portion includes at least one of application-specific agent scripts portion, a diagnostics portion and an equipment model portion.

19. The controller of claim 1, wherein the plurality of program portions farther includes a fourth program portion providing an operating system.

20. A controller configured to operate as at least one agent, the controller comprising: at least one processing device; and at least one storage medium that is in communication with the at least one processing device, wherein the at least one storage medium stores a plurality of program portions that are executed by the at least one processing device, and wherein the plurality of program portions includes a first program portion capable of generating first signals that are commands to be provided to a controlled device; and a second program portion capable of governing standard agent-type functionality; and a third program portion capable of governing application-specific agent-type functionality,
> wherein the second program portion includes a planner that governs at least a portion of the standard agent-type functionality including creating and interpreting bid request messages and bid messages, and
> wherein the second program portion is in communication with base firmware, wherein the bid request messages and bid messages that are created by the planner are provided to the base firmware, which is capable of formatting at least some of the bid request messages and bid messages for transmission onto a network according to a network protocol selected from the group consisting of Ethernet, ControlNet and DeviceNet.

21. A controller configured to operate as at least one agent, the controller comprising: at least one processing device; and at least one storage medium that is in communication with the at least one processing device, wherein the at least one storage medium stores a plurality of program portions that are executed by the at least one processing device, and wherein the plurality of program portions includes a first program portion capable of generating first signals that are commands to be provided to a controlled device; and a second program portion capable of governing standard agent-type functionality; and a third program portion capable of governing application-specific agent-type functionality,
> wherein the second program portion includes at least one directory facilitator, wherein each directory facilitator is capable of accessing a first data portion in which addresses corresponding to a first plurality of agents are listed, and a second data portion in which capabilities corresponding to a second plurality of agents are listed, wherein the second program portion includes both a local directory facilitator and a global directory facilitator, wherein the directory facilitators are permanent and generic components, and wherein the controller has employs any of a variety of protocols to organize intercommunications among the directory facilitators, wherein the third program portion includes at least one of application-specific agent scripts portion, a diagnostics portion and an equipment model portion, and wherein the third program portion includes each of the application-specific agent scripts portion, the diagnostics portion and the equipment model portion, wherein the diagnostics portion is in communication with the first program portion, wherein each of the application-specific agent scripts portion, the diagnostics portion and the equipment model portion is in communication with a planner portion of the second program portion, and wherein the application-specific agent scripts portion is further in communication with an execution controller portion of the second program portion.

22. A distributed control system for controlling a process performed by a plurality of controllable devices including first and second controllable devices, the distributed control system comprising: a network; and first and second controllers coupled to the network, wherein the first and second controllers include first and second processors, respectively, and first and second storage media, respectively; wherein first and second application-specific control programs are stored on the first and second storage media, respectively, the first and second control programs enabling the respective first and second controllers to generate commands to be provided to the first and second controllable devices, respectively; and wherein first and second agent-related programs are additionally stored on the first and second storage media, respectively, the first and second agent-related programs each including agent-type programming to enable the first and second controllers to operate as agents, to communicate with one another via the network, and to interact with the first and second control programs to govern operations of the first and second controllable devices, wherein the each of the first and second agent-related programs includes a first portion that provides for generalized agent functionality and a second portion that is specifically configured for operation in relation to at least one of a characteristic of the process, a characteristic of the first and second control programs, respectively, and a characteristic of the first and second controllable devices, respectively.

23. The distributed control system of claim 22, wherein the first portion of each of the first and second agent-related programs includes a planner and an execution controller, and the second portion of each of the first and second agent-related programs includes an application-specific agent scripts portion, a diagnostics portion and an equipment model portion.

24. The distributed control system of claim 23, wherein each of the planners interacts with at least one of a directory facilitator capable of providing agent address information and agent capability information, a capability matcher, parsing/integration software, and wrapping/unwrapping software.

* * * * *